US012079411B2

(12) United States Patent
Kim et al.

(10) Patent No.: US 12,079,411 B2
(45) Date of Patent: Sep. 3, 2024

(54) DISPLAY DEVICE AND METHOD OF DRIVING THE SAME

(71) Applicant: SAMSUNG DISPLAY CO., LTD., Yongin-si (KR)

(72) Inventors: Jung Hak Kim, Yongin-si (KR); Do Ik Kim, Yongin-si (KR); Ga Young Kim, Yongin-si (KR); Young Sik Kim, Yongin-si (KR); Sang Chul Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/309,745

(22) Filed: Apr. 28, 2023

(65) Prior Publication Data

US 2023/0266838 A1    Aug. 24, 2023

Related U.S. Application Data

(63) Continuation of application No. 16/921,764, filed on Jul. 6, 2020, now Pat. No. 11,640,211, which is a
(Continued)

(30) Foreign Application Priority Data

Sep. 29, 2017  (KR) ........................ 10-2017-0127810

(51) Int. Cl.
*G06F 3/041*  (2006.01)
*G06F 3/044*  (2006.01)
*G09G 3/3225*  (2016.01)

(52) U.S. Cl.
CPC .......... *G06F 3/0412* (2013.01); *G06F 3/0418* (2013.01); *G06F 3/04184* (2019.05);
(Continued)

(58) Field of Classification Search
CPC .... G06F 3/0412; G06F 3/0446; G06F 3/0418; G06F 3/044; G06F 2203/04111;
(Continued)

(56) References Cited

U.S. PATENT DOCUMENTS 8,564,565 B2   10/2013  Westhues
8,803,823 B2    8/2014  Chang et al.
(Continued)

FOREIGN PATENT DOCUMENTS

CN   102736291 A   10/2012
CN   103415827 A   11/2013
(Continued)

OTHER PUBLICATIONS

Chinese Office Action dated Feb. 3, 2023, issued in corresponding Chinese Patent Application No. 201811113421.X (6 pages).
(Continued)

*Primary Examiner* — Sahlu Okebato
(74) *Attorney, Agent, or Firm* — Lewis Roca Rothgerber Christie LLP

(57) ABSTRACT

A display device includes a display region and a sensing region overlapping with each other, a plurality of pixels in the display region, a plurality of first electrodes arranged in a first direction in the sensing region, a plurality of second electrodes arranged in a second direction in the sensing region, and a driving circuit including a display driver for driving the pixels corresponding to image data, and a touch driver for sensing a touch input using a sensing signal input from each of the first electrodes, and configured to supply a noise compensation signal corresponding to the image data to the second electrodes during a period in which the pixels are driven.

7 Claims, 13 Drawing Sheets

Related U.S. Application Data continuation of application No. 16/110,226, filed on Aug. 23, 2018, now Pat. No. 11,520,421.

(52) U.S. Cl.
CPC ............ G06F 3/044 (2013.01); G06F 3/0443 (2019.05); G06F 3/0445 (2019.05); G06F 3/0446 (2019.05); *G06F 2203/04111* (2013.01); *G09G 3/3225* (2013.01)

(58) Field of Classification Search
CPC .. G06F 3/04184; G06F 3/0443; G06F 3/0445; G06F 3/04182; G09G 3/3225; G09G 2300/043; G09G 2320/0693
See application file for complete search history.

(56) References Cited

U.S. PATENT DOCUMENTS

| | | | |
|---|---|---|---|
| 8,923,014 | B2 | 12/2014 | Kim et al. |
| 8,933,898 | B2 | 1/2015 | Lee et al. |
| 9,069,411 | B2 * | 6/2015 | Chang ................... G06F 3/0447 |
| 9,477,111 | B2 | 10/2016 | Kim et al. |
| 9,501,162 | B2 | 11/2016 | Cho et al. |
| 9,665,220 | B2 | 5/2017 | Park et al. |
| 9,785,276 | B2 | 10/2017 | Wei et al. |
| 9,817,535 | B2 | 11/2017 | Shepelev |
| 10,942,590 | B2 | 3/2021 | Jeong et al. |
| 2009/0315920 | A1 | 12/2009 | Sakurai et al. |
| 2011/0175823 | A1 | 7/2011 | Vieta |
| 2012/0044662 | A1 | 2/2012 | Kim et al. |
| 2013/0155000 | A1 | 6/2013 | Trend et al. |
| 2014/0240246 | A1 | 8/2014 | Kim |
| 2015/0054763 | A1 | 2/2015 | Yang et al. |
| 2015/0193080 | A1 * | 7/2015 | Takahashi ................ H01Q 1/44 345/174 |
| 2015/0220177 | A1 | 8/2015 | Park et al. |
| 2015/0220200 | A1 | 8/2015 | Kim |
| 2015/0234500 | A1 * | 8/2015 | Ishino ................... G06F 3/0445 216/6 |
| 2016/0077389 | A1 | 3/2016 | Takeda et al. |
| 2017/0075493 | A1 * | 3/2017 | Lee ....................... G06F 3/0445 |
| 2017/0091508 | A1 | 3/2017 | Han et al. |
| 2017/0185180 | A1 | 6/2017 | Chae |
| 2017/0185224 | A1 | 6/2017 | Nagata et al. |
| 2018/0088717 | A1 | 3/2018 | Chen et al. |
| 2019/0025092 | A1 | 1/2019 | Ueda et al. |

FOREIGN PATENT DOCUMENTS

| | | |
|---|---|---|
| CN | 104020873 A | 9/2014 |
| CN | 104036698 A | 9/2014 |
| CN | 106462280 A | 2/2017 |
| CN | 106557216 A | 4/2017 |
| CN | 106972039 A | 7/2017 |
| CN | 107092388 A | 8/2017 |
| CN | 107167163 A | 9/2017 |
| JP | 2014-115647 A | 6/2014 |
| KR | 10-2012-0133474 A | 12/2012 |
| KR | 10-2013-0053060 A | 5/2013 |
| KR | 10-2014-0010949 A | 1/2014 |
| KR | 10-1481674 B1 | 1/2015 |
| KR | 10-2015-0019157 A | 2/2015 |
| KR | 10-2015-0091936 A | 8/2015 |
| KR | 10-2015-0092387 A | 8/2015 |
| KR | 10-2016-0017336 A | 2/2016 |
| KR | 10-1696176 B1 | 2/2017 |
| KR | 20-0483031 Y1 | 3/2017 |

OTHER PUBLICATIONS

Office Action for U.S. Appl. No. 16/110,226 dated Nov. 18, 2019, 15 pages.
Office Action for U.S. Appl. No. 16/110,226 dated May 6, 2020, 17 pages.
Advisory Action for U.S. Appl. No. 16/110,226 dated Jul. 21, 2020, 2 pages.
U.S. Office Action dated Sep. 25, 2020, issued in U.S. Appl. No. 16/110,226 (16 pages).
U.S. Notice of Allowance dated Mar. 16, 2021, issued in U.S. Appl. No. 16/110,226 (8 pages).
Notice of Allowance for U.S. Appl. No. 16/110,226 dated Jun. 24, 2021, 5 pages.
U.S. Office Action dated Nov. 12, 2021, issued in U.S. Appl. No. 16/110,226 (15 pages).
Office Action for U.S. Appl. No. 16/110,226 dated Apr. 4, 2022, 17 pages.
US Advisory Action dated Jun. 27, 2022, issued in U.S. Appl. No. 16/110,226 (2 pages).
US Notice of Allowance dated Jul. 25, 2022, issued in U.S. Appl. No. 16/110,226 (8 pages).

* cited by examiner

DISPLAY DEVICE AND METHOD OF DRIVING THE SAME

CROSS-REFERENCE TO RELATED APPLICATIONS

This application is a continuation of U.S. patent application Ser. No. 16/921,764, filed on Jul. 6, 2020, which is a continuation of U.S. patent application Ser. No. 16/110,226, filed on Aug. 23, 2018, now U.S. Pat. No. 11,520,421, which claims priority to, and the benefit of, Korean Patent Application No. 10-2017-0127810, filed on Sep. 29, 2017 in the Korean Intellectual Property Office, the entire content of all of which is incorporated herein by reference.

BACKGROUND

1. Field

An aspect of the present disclosure relates to a display device and a method of driving the same, and more particularly, to a display device having a touch sensor and a method of driving the display device.

2. Description of the Related Art

Touch sensors may be used in display devices. For example, a touch sensor may be attached to one surface of a display panel, or may be integrally formed with the display panel, to sense a touch input.

SUMMARY

Embodiments provide a display device having a high-performance touch sensor and a method of driving the display device.

According to an aspect of the present disclosure, there is provided a display device including a display region and a sensing region overlapping with each other, a plurality of pixels in the display region, a plurality of first electrodes arranged in a first direction in the sensing region, a plurality of second electrodes arranged in a second direction in the sensing region, and a driving circuit including a display driver for driving the pixels corresponding to image data, and a touch driver for sensing a touch input using a sensing signal input from each of the first electrodes, and configured to supply a noise compensation signal corresponding to the image data to the second electrodes during a period in which the pixels are driven.

The driving circuit may include a representative value generator configured to generate a representative value of each frame data using the image data, and a compensation signal generator configured to generate the noise compensation signal using the representative value.

The representative value may be set as any one of a maximum gray scale value, a middle gray scale value, and an average gray scale value of the frame data.

The compensation signal generator may be configured to generate the noise compensation signal by predicting a display noise corresponding to the representative value and reversing the display noise.

The noise compensation signal may have a waveform that is opposite to that of a display noise corresponding to the image data.

The display device may further include a plurality of lines connected between the second electrodes and the driving circuit, and connected to the second electrodes in a first edge region of the sensing region.

The first edge region may be a region to which a display noise having the largest intensity is transferred in the sensing region.

The display device may further include a plurality of third electrodes arranged in the sensing region to cross the first electrodes, and spaced apart from the first and second electrodes.

The touch driver may be configured to supply a touch driving signal to the third electrodes during a touch sensing period.

Each of the first electrodes may include a plurality of first electrode cells arranged along the first direction, and at least one first connection part connecting the first electrode cells along the first direction.

Each of the second electrodes may include a plurality of electrode parts arranged along the second direction, and located to correspond to any of the first electrode cells, and at least one connection line connecting the electrode parts along the second direction.

Each of the electrode parts may overlap with a respective one of the first electrode cells.

Each of the first electrode cells may include an opening provided at the inside thereof, and each of the electrode parts may be located in a respective one of the openings.

The display device may further include an encapsulation layer covering the pixels, wherein at least one of the first electrodes and the second electrodes is directly on one surface of the encapsulation layer.

The encapsulation layer may be between the first and second electrodes and the pixels.

According to an aspect of the present disclosure, there is provided a method of driving a display device including a display region in which a plurality of pixels are located, and a touch sensor including a plurality of first and second electrodes in a sensing region overlapping with the display region, the method including generating a noise compensation signal using image data, driving the pixels, corresponding to the image data, and supplying the noise compensation signal to the second electrodes during a period in which the pixels are driven, receiving a sensing signal from each of the first electrodes, and detecting a touch input using the sensing signal.

The generating of the noise compensation signal may include generating a representative value of each frame data included in the image data, calculating or extracting a display noise using the representative value, and generating the noise compensation signal by reversing the display noise.

The generating of the representative value may include extracting any one of a maximum gray scale value, a middle gray scale value, and an average gray scale value of the frame data.

The noise compensation signal may be supplied to the second electrodes for every frame period in which the pixels are driven.

The touch sensor may further include a plurality of third electrodes spaced apart from the first and second electrodes, and the method may further include receiving the sensing signal from each of the first electrodes while the noise compensation signal and a touch driving signal are supplied to the respective second and third electrodes.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
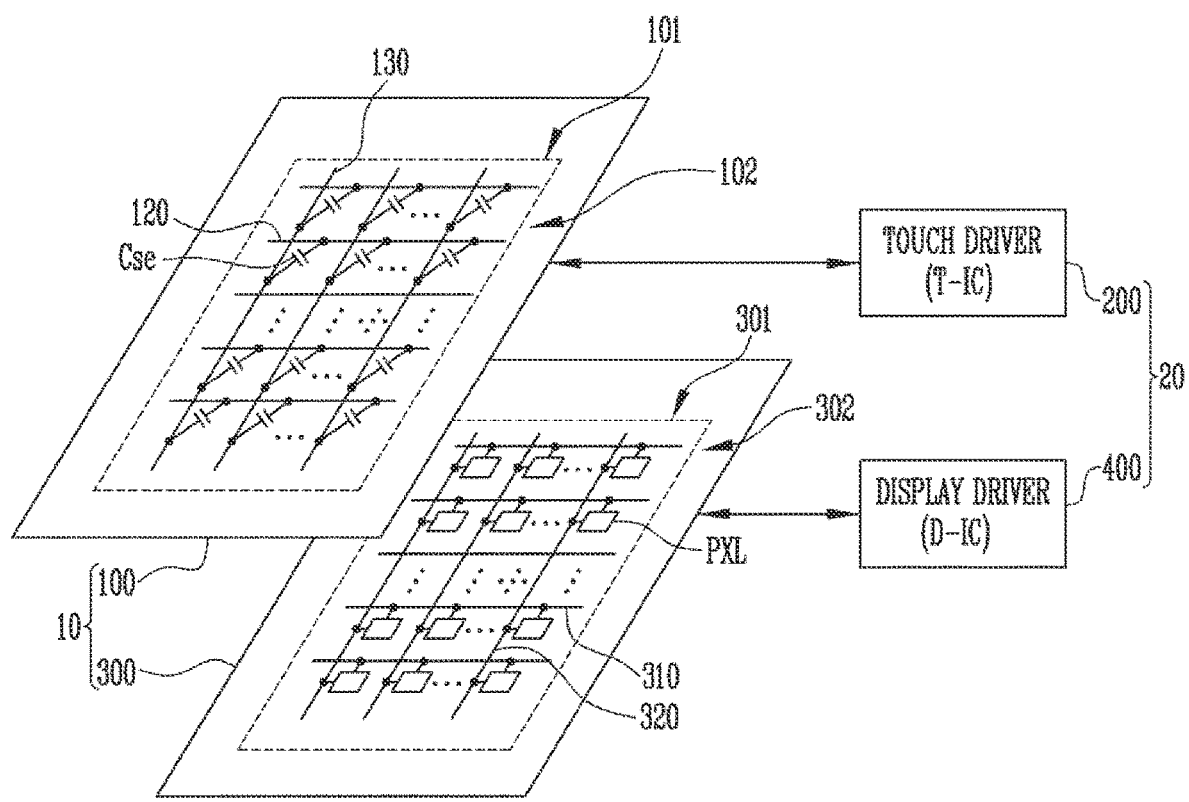
FIG. 1 schematically illustrates a display device according to an embodiment of the present disclosure.

Hereinafter, exemplary embodiments of the present disclosure will be described in detail with reference to the accompanying drawings. However, the present disclosure is not limited to the embodiments but may be implemented into different forms. These embodiments are provided only for illustrative purposes and for full understanding of the scope of the present disclosure by those skilled in the art. In the entire specification, when an element is referred to as being "connected" or "coupled" to another element, it can be directly connected or coupled to the another element or be indirectly connected or coupled to the another element with one or more intervening elements interposed therebetween.

Meanwhile, in the following embodiments and the attached drawings, elements not directly related to the present disclosure are omitted from depiction, and dimensional relationships among individual elements in the attached drawings are illustrated only for ease of understanding but not to limit the actual scale. It should note that in giving reference numerals to elements of each drawing, like reference numerals refer to like elements even though like elements are shown in different drawings.

Figure 2:
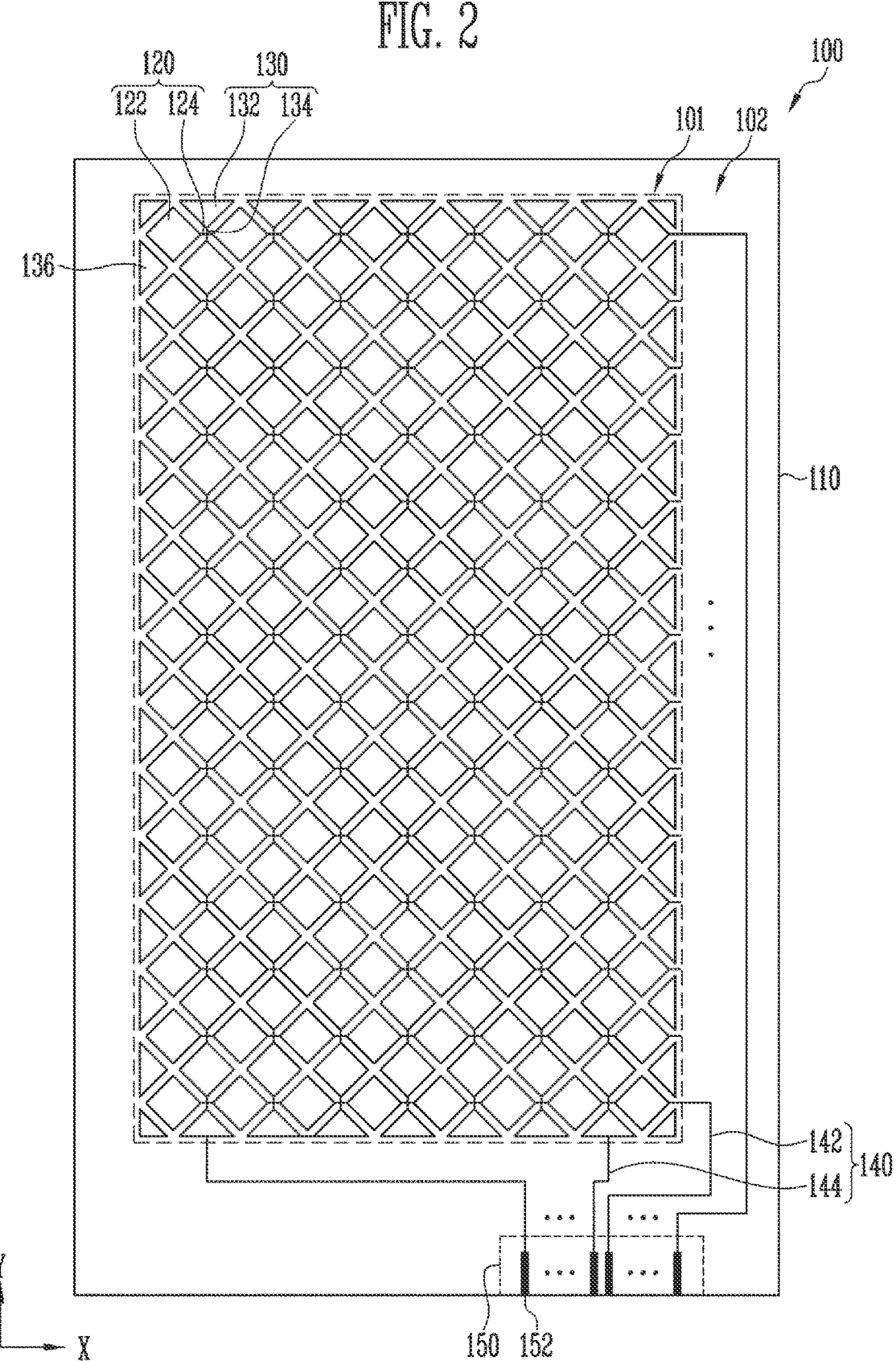
FIG. 2 illustrates a sensor portion of a touch sensor according to an embodiment of the present disclosure.

FIG. 1 schematically illustrates a display device according to an embodiment of the present disclosure. FIG. 2 illustrates a sensor portion of a touch sensor according to an embodiment of the present disclosure.

Referring to FIG. 1, the display device according to the embodiment of the present disclosure includes a sensor portion 100, a touch driver 200, a display panel 300, and a display driver 400. The sensor portion 100 and the display panel 300 may overlap with each other, or may be integrally manufactured. The sensor portion 100 and the display panel 300 constitute a panel 10 of the display device. The touch driver 200 and the display driver 400 are used to drive the sensor portion 100 and the display panel 300, respectively. The touch driver 200 and the display driver 400 constitute a driving circuit 20 of the display device. In some embodiments, the touch driver 200 and the display driver 400 may be configured to be separated from each other, or at least portions of the touch driver 200 and the display driver 400 may be integrated together in the same driver IC. Meanwhile, the display device according to the embodiment of the present disclosure may include a touch sensor, and the touch sensor may be configured with the sensor portion 100 and the touch driver 200.

In some embodiments, the sensor portion 100 may be provided on at least one region of the display panel 300. For example, the sensor portion 100 may be provided on at least one surface of the display panel 300 to overlap with the display panel 300. As an example, the sensor portion 100 may be located on one surface of the display panel 300 (e.g., an upper surface) in a direction in which an image is emitted.

In another embodiment, the sensor portion 100 may be directly formed on at least one surface between the surfaces of the display panel 300, or may be formed at the inside of the display panel 300. For example, the sensor portion 100 may be directly formed on an outer surface of an upper substrate (or encapsulation layer) or a lower substrate of the display panel 300 (e.g., an upper surface of the upper substrate or a lower surface of the lower substrate), or may be directly formed on an inner surface of the upper substrate or the lower substrate (e.g., a lower surface of the upper substrate or an upper surface of the lower substrate).

The sensor portion 100 includes a sensing region 101 that responds to a touch input, and a peripheral region 102 that surrounds at least a portion of the sensing region 101. That is, the sensing region 101 is a region capable of sensing a touch input caused by a user, and may be a sensing region of the touch sensor. In some embodiments, the sensing region 101 may correspond to a display region 301 of the display panel 300, and the peripheral region 102 may correspond to a non-display region 302 of the display panel 300. For example, the sensing region 101 may overlap with the display region 301, and the peripheral region 102 may overlap with the non-display region 302.

In some embodiments, at least one electrode (e.g., a plurality of sensing electrodes (first electrodes) 120 and a plurality of driving electrodes (third electrodes) 130, which are spaced apart from each other) may be located in the sensing region 101. In some embodiments, the sensing electrodes 120 and the driving electrodes 130 may be located on the display region 301 to overlap with at least one display electrodes provided in the display panel 300. For example, when the display panel 300 is an organic light emitting display panel or a liquid crystal display panel, the sensing electrodes 120 and the driving electrodes 130 may overlap with at least a cathode electrode or common electrode of the display panel 300.

In some embodiments, the sensing electrodes 120 and the driving electrodes 130 may be arranged in the sensing region 101 to cross each other. As an example, the sensing electrodes 120 may be arranged in a first direction (e.g., an X direction) in the sensing region 101, and the driving electrodes 130 may be arranged in a second direction (e.g., a Y direction) in the sensing region 101 to cross the sensing electrodes 120. The sensing electrodes 120 and the driving electrodes 130 may be insulated from each other by an insulating layer, an insulating pattern, and/or a space.

Capacitances Cse are formed between the sensing electrodes 120 and the driving electrodes 130, for example, at crossing regions of the sensing electrodes 120 and the driving electrodes 130. Such a capacitance Cse is changed when a touch input occurs at a corresponding point or in the vicinity thereof. Thus, a touch input can be sensed by detecting a change in the capacitance Cse.

The shape, size and/or arrangement direction of the sensing electrodes 120 and the driving electrodes 130 are not particularly limited. In an unlimited embodiment related to this, the sensing electrodes 120 and the driving electrodes 130 may be configured as shown in FIG. 2. In FIGS. 1 and 2, a touch sensor using a mutual capacitance method will be disclosed as the touch sensor according to the present embodiment. However, the touch sensor according to the present embodiment is not necessarily limited to the touch sensor using the mutual capacitance method.

Referring to FIG. 2, the sensor portion 100 includes a base substrate 110 including an sensing region 101 and a peripheral region 102, a plurality of sensing electrodes 120 and a plurality of driving electrodes 130, which are provided in the sensing region 101 on the base substrate 110, and a plurality of lines 140 and a pad portion 150, which are provided in the peripheral region 102 on the base substrate 110. Meanwhile, in another embodiment of the present disclosure, the touch sensor may be implemented as a touch sensor using a self-capacitance method. In this case, a plurality of touch electrodes may be dispersed at coordinate points of the sensing region 101, respectively.

The base substrate 110 is a substrate that becomes a base member of the sensor portion, and may be a rigid substrate or a flexible substrate. For example, the base substrate 110 may be a rigid substrate made of glass or tempered glass, or a flexible substrate made of flexible plastic or metallic thin film. Meanwhile, in some embodiments, the base substrate 110 may be a display substrate constituting the display panel 300 or one of one or more insulating layers. For example, in an embodiment in which the sensor portion 100 and the display panel 300 are integrally implemented, the base substrate 110 may be at least one display substrate (e.g., an upper substrate) or a thin film encapsulation (TFE).

The sensing electrodes 120 may extend along a first direction, e.g., an X direction in the sensing region 101. In some embodiments, each of the sensing electrodes 120 may include a plurality of electrode cells 122 arranged along the first direction and at least one first connection part 124 connecting the first electrode cells 122 constituting the sensing electrode 120 along the first direction. In the present embodiment, the "connection" may comprehensively mean "connection" in physical and/or electrical aspects. When each of the sensing electrodes 120 includes three or more first electrode cells 122, each of the sensing electrodes 120 may include a plurality of first connection parts 124. In some embodiments, the first connection parts 124 may be integrally configured with the first electrode cells 122, or may be configured as bridge-type connection patterns.

Meanwhile, an embodiment in which the first connection parts 124 are located along the first direction is illustrated in FIG. 2, but the present disclosure is not limited thereto. For example, in another embodiment, the first connection parts 124 may be located in an oblique direction inclined with respect to the first direction. In addition, an embodiment in which the first connection parts 124 have a linear shape (or bar shape) is illustrated in FIG. 2, but the present disclosure is not limited thereto. In addition, an embodiment in which two adjacent first electrode cells 122 are connected to each other through one first connection part 124 located therebetween is illustrated in FIG. 2, but the present disclosure is not limited thereto. For example, in another embodiment, two adjacent first electrode cells 122 may be connected to each other through a plurality of first connection parts 124 located therebetween.

In some embodiments, the first electrode cells 122 and/or the first connection parts 124 may include at least one of a metallic material, a transparent conductive material, and other various conductive materials, thereby having conductivity. As an example, the first electrode cells 122 and/or the first connection parts 124 may include at least one of various metallic materials such as gold (Au), silver (Ag), aluminum (Al), molybdenum (Mo), chromium (Cr), titanium (Ti), nickel (Ni), neodymium (Nd), copper (Cu), and platinum (Pt), or any alloy thereof. Also, the first electrode cells 122 and/or the first connection parts 124 may include at least one of various transparent conductive material such as silver nano wire (AgNW), indium tin oxide (ITO), indium zinc oxide (IZO), antimony zinc oxide (AZO), indium tin zinc oxide (ITZO), zinc oxide (ZnO), tin oxide ($SnO_2$), carbon nano tube, and graphene. In addition, the first electrode cells 122 and/or the first connection parts 124 may include at least one of various conductive materials capable of providing conductivity. In some embodiments, the first electrode cells 122 and/or the first connection parts 124 may be provided in a single layer or a multi-layer.

In some embodiments, when the touch sensor according to the present embodiment is the touch sensor using the mutual capacitance method, the sensing electrodes 120 may output a sensing signal corresponding to a driving signal input to the driving electrodes 130. As an example, the sensing electrodes 120 may be Rx electrodes that output a sensing signal corresponding to a touch input to the touch driver 200.

The driving electrodes 130 may extend along a second direction, e.g., a Y direction in the sensing region 101. In some embodiments, each of the driving electrodes 130 may include a plurality of second electrode cells 132 arranged along the second direction, and at least one second connection part 134 connecting the second electrode cells 132 constituting the driving electrode 130 along the second direction. When each of the driving electrodes 130 includes three or more second electrode cells 132, each of the driving electrodes 130 may include a plurality of second connection parts 134. In some embodiments, the second connection parts 134 may be integrally configured with the second electrode cells 132, or may be configured as bridge-type connection patterns. When the touch sensor according to the present embodiment is the touch sensor using the mutual capacitance method, the driving electrodes 130 may be Tx electrodes that receive a driving signal from the touch driver 200 during a touch sensing period in which the touch sensor is activated.

Meanwhile, for convenience, a case where the first and second electrode cells 122 and 132 have a diamond shape is illustrated in FIG. 2, but the shape and size of the first and second electrode cells 122 and 132 may be variously changed. As an example, the first and second electrode cells 122 and 132 may have another shape such as a circular shape or a hexagonal shape. In another embodiment, each of the sensing electrodes 120 and the driving electrodes 130 may be implemented with an integrated bar-type electrode, etc.

In addition, an embodiment in which the second connection parts 134 are located in the second direction is illustrated in FIG. 2, but the present disclosure is not limited thereto. For example, in another embodiment, the second connection parts 134 may be located in an oblique direction inclined with respect to the second direction. In addition, an embodiment in which the second connection parts 134 have a linear shape (or bar shape) is illustrated in FIG. 2, but the present disclosure is not limited thereto. For example, in another embodiment, the second connection parts 134 may have a shape in which at least one region of the second connection parts 134 is curved or bent. In addition, an embodiment in which two adjacent second electrode cells 132 are connected to each other through one second connection part 134 located therebetween is illustrated in FIG. 2, but the present disclosure is not limited thereto. For example, in another embodiment, two adjacent second electrode cells 132 may be connected to each other through a plurality of second connection parts 134 located therebetween.

In some embodiments, the second electrode cells 132 and/or the second connection parts 134 may include at least one of a metallic material, a transparent conductive material, and other various conductive materials, thereby having conductivity. As an example, the second electrode cells 132 and/or the second connection parts 134 may include at least one of the conductive materials mentioned as the material constituting the first electrode cells 122 and/or the first connection parts 124. Also, the second electrode cells 132 and/or the second connection parts 134 may be made of the same material as the conductive material constituting the first electrode cells 122 and/or the first connection parts 124, or may be made of a material different from the conductive material constituting the first electrode cells 122 and/or the first connection parts 124. Also, each of the second electrode cells 132 and/or the second connection parts 134 may be provided in a single layer or a multi-layer.

In some embodiments, first dummy patterns 136 that are floated may be provided in at least one edge region of the sensing region 101. As an example, a plurality of first dummy patterns 136 that are floated in an island shape may be provided in both edge regions of the sensing region 101. Meanwhile, in another embodiment, the first dummy patterns 136 may be omitted or be connected in the first or second direction to constitute the sensing electrode 120 or the driving electrode 130.

In some embodiments, the lines 140 for electrically connecting the sensing electrodes 120 and the driving electrodes 130, which are provided in the sensing region 101, to the touch driver 200, etc. may be located in the peripheral region 102. In some embodiments, the lines 140 may include first lines 142 for electrically connecting the respective sensing electrodes 120 to the pad portion 150, and second lines 144 for electrically connecting the respective driving electrodes 130 to the pad portion 150. For example, each of the lines 140 may electrically connect any one of the sensing electrodes 120 and the driving electrodes 130 to a corresponding pad 152 included in the pad portion 150.

Meanwhile, for convenience, a case where the first lines 142 and the second lines 144 are respectively connected to respective ends of the sensing electrodes 120 and the driving electrodes 130 is illustrated in FIG. 2. However, the connection structure between the sensing and driving electrodes 120 and 130 and the first and second lines 142 and 144 may be variously changed. For example, in another embodiment, at least one of the first lines 142 and the second lines 144 may be connected to both ends of the sensing electrodes 120 or the driving electrodes 130.

The pad portion 150 may include a plurality of pads 152 for electrically connecting the sensing electrodes 120 and the driving electrodes 130 to an external driving circuit, e.g., the touch driver 200. The sensor portion 100 and the touch driver 200 may communicate with each other through the pad portion 150.

Referring back to FIG. 1, the touch driver 200 is electrically connected to the sensor portion 100 to transmit/receive signals required to drive the sensor portion 100. As an example, the touch driver 200 may supply a driving signal to the sensor portion 100, and may then receive a sensing signal corresponding to the driving signal from the sensor portion 100. The touch driver 200 may sense a touch input, based on the sensing signal. To this end, the touch driver 200 may include a touch driving circuit and a sensing circuit. In some embodiments, the touch driving circuit and the sensing circuit may be integrated in one touch IC (T-IC), but the present disclosure is not limited thereto. Also, in some embodiments, the touch driver 200 along with the display driver 400 may be integrated as one driving IC.

In some embodiments, the touch driving circuit may be electrically connected to the driving electrodes 130 of the sensor portion 100 to sequentially supply a touch driving signal to the driving electrodes 130 during a touch sensing period. In some embodiments, the sensing circuit may be electrically connected to the sensing electrodes 120 of the sensor portion 100 to receive a sensing signal from the sensing electrodes 120, and to detect a touch input, based on the sensing signal.

The display panel 300 includes the display region 301, and a non-display region 302 surrounding at least one region of the display region 301. The display region 301 may be provided with a plurality of scan lines 310, a plurality of data lines 320, and a plurality of pixels PXL connected to the scan lines 310 and the data lines 320. The non-display region 302 may be provided with various driving signals for driving the pixels PXL and/or lines for supplying driving power.

In the present disclosure, the kind of the display panel 300 is not particularly limited. For example, the display panel 300 may be a self-luminescent display panel, such as an organic light emitting display panel (OLED panel). Alternatively, the display panel 300 may be a non-self-luminescent display panel such as a liquid crystal display panel (LCD panel), an electrophoretic display panel (EDP panel), or an electro-wetting display panel (EWD panel). When the display panel 300 is not a self-luminescent display panel, the display device may further include a backlight for supplying light to the display panel 300.

The display driver 400 drives the pixels PXL, corresponding to an image data input from the outside. To this end, the display driver 400 is electrically connected to the display panel, to supply signals required to drive the pixels PXL to the display panel 300. As an example, the display driver 400 may include at least one of a scan driver for supplying a scan signal to the scan lines 310, a data driver for supplying a data signal to the data lines 320, and a timing controller for driving the scan driver and the data driver. In some embodiments, the scan driver, the data driver, and/or the timing controller may be integrated in one display IC (D-IC), but the present disclosure is not limited thereto. For example, in another embodiment, at least one of the scan driver, the data driver, and the timing controller may be equipped in the display panel 300.

As described above, the display device includes the touch sensor so that it is possible to provide convenience of use. For example, a user may easily control the display device by touching a screen while viewing an image displayed in the display region 301.

Figure 3:
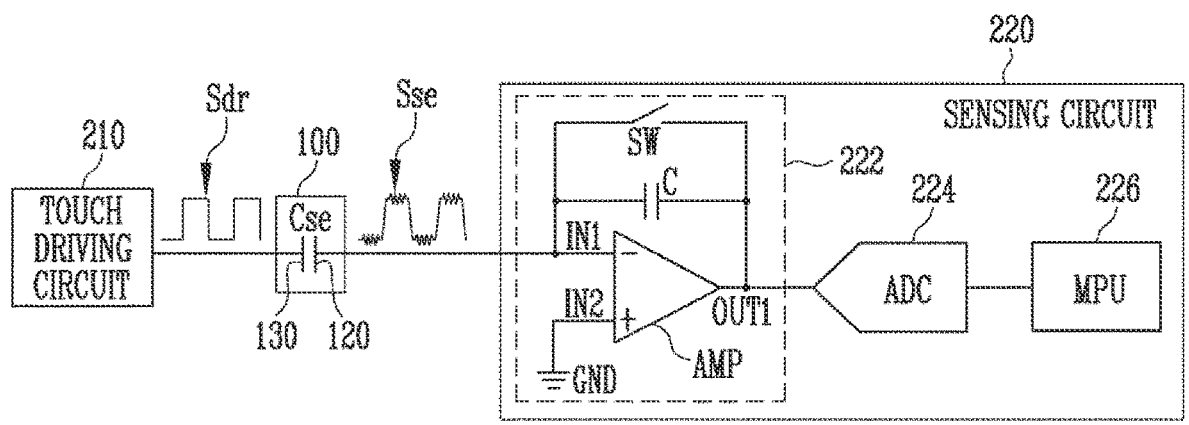
FIG. 3 illustrates a touch sensor according to an embodiment of the present disclosure.

FIG. 3 illustrates a touch sensor according to an embodiment of the present disclosure. For convenience, one sensing electrode and one driving electrodes among the sensing electrodes and the driving electrodes, which are provided in the sensor portion, and a capacitance formed at a crossing region thereof, will be illustrated in FIG. 3. In addition, based on the sensing electrode and the driving electrode, which form the capacitance, the driving circuit and the sensing circuit will be illustrated in FIG. 3.

Referring to FIG. 3, the sensor portion 100 may include at least one pair of a sensing electrode 120 and a driving electrode 130, which form a capacitance Cse. The driving electrode 130 is electrically connected to a touch driving circuit 210 of the touch driver 200, and the sensing electrode 120 is electrically connected to a sensing circuit 220. In some embodiments, the touch driving circuit 210 and the sensing circuit 220 may be integrated together in the touch driver 200.

A driving method of the touch sensor according to the present embodiment will be described. During a touch sensing period in which the touch sensor is activated, a touch driving signal Sdr is supplied from the touch driving circuit 210 to the driving electrode 130. In some embodiments, the touch driving signal Sdr may be an AC signal having a given period, such as a pulse wave.

When the sensor portion 100 includes a plurality of driving electrodes 130, as shown in FIGS. 1 and 2, the touch driving circuit 210 may sequentially supply driving signals Sdr to the driving electrodes 130. Then, by coupling of the capacitance Cse, sensing signals Sse, which correspond to the driving signals Sdr applied to the driving electrodes 130, are output through the sensing electrodes 120, respectively. The sensing signals Sse are input to the sensing circuit 220.

In some embodiments, when the sensor portion 100 includes a plurality of sensing electrodes 120, as shown in FIGS. 1 and 2, the sensing circuit 220 may include a plurality of sensing channels (Rx channels) 222 electrically connected to the respective sensing electrodes 120. The sensing circuit 220 may receive sensing signals Sse from the sensing electrodes 120 through the sensing channels 222, respectively.

Meanwhile, in some embodiments, each of the sensing electrodes 120 along with an amplifier connected to the sensing electrode 120 may constitute each sensing channel 222. However, for convenience of illustration, a case where the sensing electrodes 120 provided in the sensor portion 100 are distinguished from the sensing channels 222 provided in the sensing circuit 220 will be described below.

The sensing circuit 220 amplifies, converts, and processes sensing signals Sse input from the respective sensing electrodes 120, and detects a touch input based on the result. To this end, the sensing circuit 220 may include a plurality of sensing channels 222 corresponding to the respective sensing electrodes 120, and at least one analog-to-digital converter (hereinafter, referred to as "ADC") 224 connected to the sensing channels 222, and a processor ("MPU") 226.

In some embodiments, each of the sensing channels 222 may be configured as an analog front end (hereinafter, referred to as "AFE") that receives a sensing signal from a sensing electrode 120 corresponding thereto. In some embodiments, each of the sensing channels 222 may be implemented as an AFE including at least one amplifier AMP such as an operational amplifier (OP AMP).

In some embodiments, each of the sensing channels 222 may include a first input terminal IN1 (e.g., an inverting input terminal of the amplifier AMP) and a second input terminal IN2 (e.g., a non-inverting input terminal of the amplifier AMP). In some embodiments, the first input terminals IN1 of the sensing channels 222 may be connected to different sensing electrodes 120 among the sensing electrodes 120, respectively. That is, the sensing channels 222 and the sensing electrodes 120 may be connected one by one. In this case, a sensing signal Sse from any one of the sensing electrodes 120 may be input to the first input terminal IN1 of each of the sensing channels 222.

In some embodiments, the second input terminal IN2 of each of the sensing channels 222 may be a reference potential terminal. As an example, the second input terminal IN2 of each of the sensing channels 222 may be connected to a reference voltage source, such as a ground (GND) power source. In this case, each of the sensing channels 222 may amplify and output a sensing signal Sse input to the first input terminal IN1 based on the potential of the second input terminal IN2. That is, each of the sensing channels 222 receives a sensing signal Sse from a corresponding one of the sensing electrodes 120 through the first input terminal IN1, and amplifies and outputs a signal corresponding to the difference between voltages of the first input terminal IN1 and the second input terminal IN2, thereby amplifying the sensing signal Sse.

In some embodiments, the amplifier AMP may be implemented with an integrator. In this case, a capacitor C and a reset switch SW may be connected in parallel between the first input terminal IN1 and an output terminal OUT1 of the amplifier AMP.

The ADC 224 converts an analog signal input from each of the sensing channels 222 into a digital signal. In some embodiments, ADCs 224, which may have a number corresponding to that of the sensing electrodes 120, may correspond one-to-one to the sensing channels 222. Alternatively, in some embodiments, a plurality of sensing channels 222 may be configured to share one ADC 224. In this case, a switching circuit for channel selection may be additionally provided between the sensing channel 222 and the ADC 224.

The processor 226 processes the digital signals converted in the ADC 224, and detects a touch input based on the signal processing result. As an example, the processor 226 may detect whether a touch input has occurred, and may detect a position of the touch input by synthetically analyzing the signals (the amplified and digital-converted sensing signals Sse) input from the plurality of sensing electrodes 120 via the sensing channels 222 and the ADC 224.

In some embodiments, the processor 226 may be implemented with a microprocessor (MPU). In this case, a memory required to drive the processor 226 may be additionally provided in the sensing circuit 220. Meanwhile, the configuration of the processor 226 is not limited thereto. As another example, the processor 226 may be implemented with a microcontroller (MCU), etc.

The touch sensor described above may be combined with the display panel 300, etc. As an example, the sensor portion 100 of the touch sensor may be integrally manufactured with the display panel 300, or may be attached onto at least one surface of the display panel 300 after the sensor portion 100 is manufactured separately from the display panel 300.

If the sensor portion 100 is combined with the display panel 300 as described above, a parasitic capacitance is generated between the sensor portion 100 and the display panel 300. As an example, the sensing electrode 120 and the driving electrode 130 of the sensor portion 100 may be located to overlap with the cathode electrode or common electrode of the display panel 300, and therefore, a parasitic capacitance is generated between the sensor portion 100 and the display panel 300.

A display noise from the display panel 300 may be transferred to the touch sensor, for example, to the sensor portion 100, due to coupling of the parasitic capacitance. For example, a display noise (e.g., a common mode noise) caused by a display driving signal applied to the display panel 300 may be introduced into the sensor portion 100.

As an example, in the display device according to the present embodiment, the display panel 300 may be an organic light emitting display panel including a TFE, and the sensor portion 100 may be configured with on-cell type sensor electrodes provided as the sensing electrodes 120 and the driving electrodes 130 directly formed on one surface (e.g., an upper surface) of the TFE. In this case, at least one electrode (e.g., a cathode electrode) provided in the organic light emitting display panel, the sensing electrodes 120, and the driving electrodes 130 are located adjacent to one another. Therefore, a display noise caused by display driving may be transferred with a relatively large intensity to the sensor portion 100 as the display device is driven.

Figure 4:
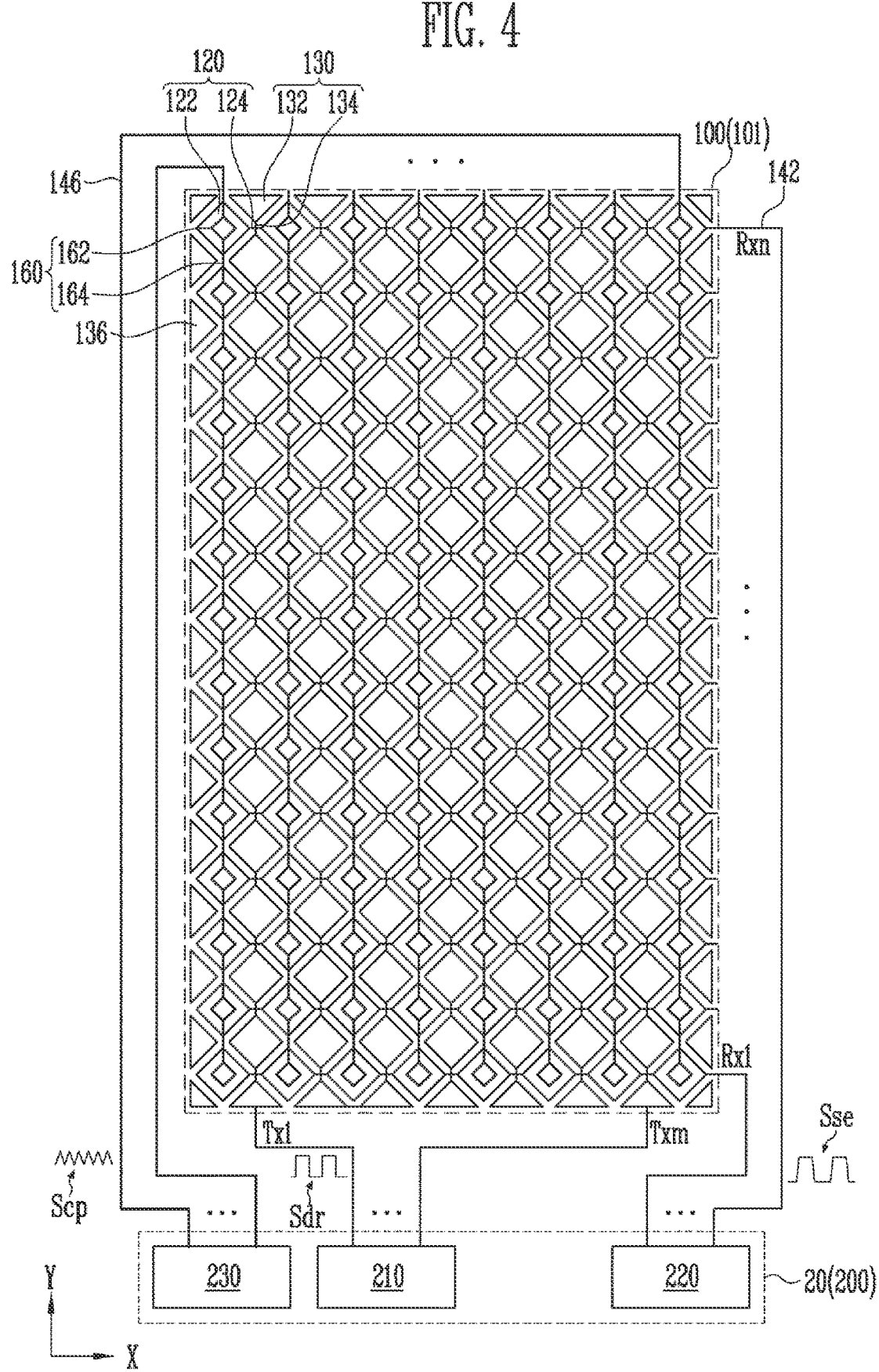
FIG. 4 illustrates a touch sensor according to an embodiment of the present disclosure.
Figure 5:
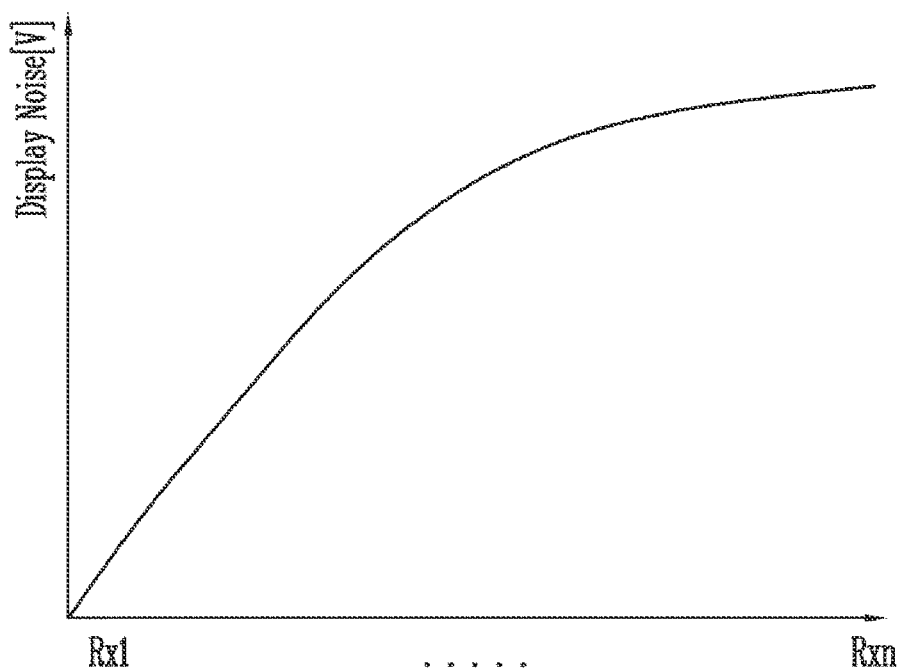
FIG. 5 illustrates a display noise transferred to a sensor portion shown in FIG. 4.
Figure 6:
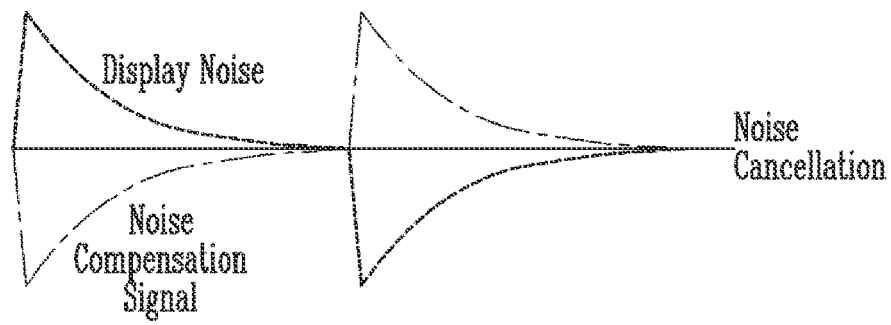
FIG. 6 illustrates a display noise and a noise compensation signal, which are transferred to the sensor portion of FIG. 4, and noise cancellation according thereto.

The display noise transferred to the sensor portion 100 causes ripples of sensing signals Sse, and therefore, the sensitivity of the touch sensor may be decreased. Accordingly, in the present disclosure, there are provided various embodiments which can prevent the malfunction of the touch sensor provided in the display device and improve the performance (e.g., sensitivity) of the touch sensor FIG. 4 illustrates a touch sensor according to an embodiment of the present disclosure. In FIG. 4, components similar or identical to those of FIGS. 1 to 3 are designated by like reference numerals, and their detailed descriptions will not be repeated. FIG. 5 illustrates a display noise transferred to a sensor portion shown in FIG. 4. For example, FIG. 5 illustrates magnitudes (e.g., amplitudes) of display noises transferred from the display panel corresponding to the positions of sensing electrodes. FIG. 6 illustrates a display noise and a noise compensation signal, which are transferred to the sensor portion of FIG. 4, and noise cancellation according thereto.

First, referring to FIG. 4, the touch sensor according to the embodiment of the present disclosure includes a sensor portion 100 including a plurality of sensing electrodes 120 and a plurality of driving electrodes 130, and a touch driving circuit 210 and a sensing circuit 220, which are electrically connected to the sensor portion 100. Also, the touch sensor according to the embodiment of the present disclosure further includes a plurality of noise compensation electrodes (second electrodes) 160 extending in any one direction (e.g., a first or second direction) in a sensing region 101, and a compensation signal supplier 230 connected to the noise compensation electrodes 160.

In some embodiments, the noise compensation electrodes 160 may be arranged in a second direction (e.g., a Y direction) in the sensing region 101 to cross the sensing electrodes 120. As an example, like the driving electrodes 130, the noise compensation electrodes 160 extend in the second direction, and may be spaced apart from the driving electrodes 130. For example, the noise compensation electrodes 160 and the driving electrodes 130 may be alternately located in the sensing region 101. In addition, the noise compensation electrodes 160 may be spaced apart from the sensing electrodes 120 by an insulating layer, an insulating pattern, and/or a space. That is, the sensing electrodes 120, the driving electrodes 130, and the noise compensation electrodes 160 may be insulated from one another.

In some embodiments, each of the noise compensation electrodes 160 may include a plurality of electrode parts 162 arranged along the second direction in the sensing region 101, and at least one connection line 164 connecting the electrode parts 162 along the second direction. In some embodiments, when each of the noise compensation electrodes 160 includes three or more electrode parts 162, each of the noise compensation electrodes 160 may include a plurality of connection lines 164. Meanwhile, the shape and/or configuration of the noise compensation electrodes 160 is not limited thereto. For example, in another embodiment of the present disclosure, each of the noise compensation electrodes 160 may be implemented with an integrated bar-type electrode, etc.

In some embodiments, each of the electrode parts 162 may correspond (e.g., overlap with) any one of first electrode cells 122 constituting the sensing electrodes 120. As an example, electrode parts 162 of a noise compensation electrode 160 located on a first column may overlap with first electrode cells 122 located on the first column among the first electrode cells 122 of the sensing electrodes 120.

Meanwhile, for convenience, a case where the electrode parts 162 have a diamond shape is illustrated in FIG. 4, but the shape and size of the electrode parts 162 may be variously changed. As an example, the electrode parts 162 may have another shape, such as a circular shape or a hexagonal shape. Also, in FIG. 4, it is illustrated that each of the electrode parts 162 is located at the center of a first electrode cell 122 corresponding thereto while having an area smaller than that of the first electrode cell 122, but the present disclosure is not limited thereto. For example, in another embodiment, the electrode parts 162 may overlap with the respective first electrode cells 122 while having an area similar or substantially equal to that of the first electrode cells 122. Alternatively, in another embodiment, the electrode parts may be located in respective openings formed by opening the centers of the first cell electrodes 122.

In some embodiments, the connection lines 164 may be integrally configured with the electrode parts 162 or be configured as bridge-type connection patterns. In addition, an embodiment in which the connection lines 164 are located in the second direction is illustrated in FIG. 4, but the present disclosure is not limited thereto. For example, in another embodiment, second connection parts 134 may be located in an oblique direction inclined with respect to the second direction or have a shape in which at least one region of each of the second connection parts 134 is curved or bent.

In addition, an embodiment in which two adjacent electrode parts 162 is connected to each other through one connection line 164 located therebetween is illustrated in FIG. 4, but the present disclosure is not limited thereto. For example, in another embodiment, two adjacent electrode parts 162 may be connected to each other through two or more connection lines 164 located therebetween.

In some embodiments, the electrode parts 162 and/or the connection lines 164 may include at least one of a metallic material, a transparent conductive material, and other various conductive materials, thereby having conductivity. As an example, the electrode parts 162 and/or the connection lines 164 may include at least one of the conductive materials mentioned as the material constituting the first electrode cells 122, first connection parts 124, second electrode cells 132, and/or the second connection parts 134, which are described above.

Also, the electrode parts 162 and/or the connection lines 164 may be located on the same layer as the first electrode cells 122, the first connection parts 124, the second electrode cells 132, and/or the second connection parts 134. As an example, when the first connection parts 124 are implemented as bridge patterns located on a layer different from that of the first and second electrode cells 122 and 132, the electrode parts 162 and the connection lines 164 may be located on the same layer as the first connection parts 124 while being spaced apart from the first connection parts 124. However, the material constituting the electrode parts 162 and/or the connection lines 164 or the arrangement positions of the electrode parts 162 and/or the connection lines 164 may be variously changed. As an example, the electrode parts 162 and/or the connection lines 164 may be located on a layer different from that on which the first and second electrode cells 122 and 132 and the first and second connection parts 124 and 134 are located. In addition, each of the electrode parts 162 and/or the connection lines 164 may be provided in a single layer or a multi-layer, and the structure of each of the electrode parts 162 and/or the connection lines 164 is not particularly limited.

In some embodiments, the noise compensation electrodes 160 may be connected to a driving circuit 20 through at least one third line 146. As an example, a plurality of third lines 146 may be connected between the noise compensation electrodes 160 and the driving circuit 20, and each of the noise compensation electrodes 160 may be connected to the driving circuit 20 (e.g., the compensation signal supplier 230 provided in the driving circuit 20) through any one of the third lines 146.

In some embodiments, the third lines 146 may be connected to first ends of the respective noise compensation electrodes 160 in any one edge region of the sensing region 101. For example, in an embodiment of the present disclosure, the noise compensation electrodes 160 may be located to extend along a direction in which a display noise is gradually changed (increased or decreased). In addition, the third lines 146 may be connected to first ends of the respective noise compensation electrodes 160 in any one edge region (e.g., a first edge region) to which a relatively largest display noise is transferred in the sensing region 101.

In some embodiments, the display noise may be introduced with different intensities and/or degrees at respective positions of the sensing electrodes 120 in the sensing region 101. As an example, the display noise may be transferred with different intensities and/or degrees at positions of the sensing electrodes 120 in the sensing region 101 according to the direction in which a display driving signal supplied to the display panel 300 is transferred. That is, display noises having different intensities and/or degrees may be transferred to the respective sensing electrodes 120.

For example, as shown in FIG. 5, when sensing electrodes 120, which correspond to first to nth (n is a natural number of 2 or more) sensing channels Rx1 to Rxn, are located in a direction from a lower end to an upper end of the sensing region 101, the magnitude of a display noise (e.g., the magnitude of a noise voltage) transferred to the sensing electrodes 120 corresponding to the first to nth sensing channels Rx1 to Rxn may gradually increase. As an example, the magnitude of a display noise transferred to a sensing electrode 120 adjacent to an upper edge region of the sensing region (e.g., a sensing electrode 120 corresponding to the nth sensing channel Rxn) may be larger than that of a display noise transferred to a sensing electrode 120 adjacent to a lower edge region of the sensing region (e.g., a sensing electrode 120 corresponding to the first sensing channel Rx1).

In this case, each of the noise compensation electrodes 160 may cross sensing electrodes 120 located in a row direction while extending in a column direction in the sensing region 101, and the area of the noise compensation electrode 160 may be partially enlarged at a crossing region of the noise compensation electrode 160 and the sensing electrodes 120.

Meanwhile, in another embodiment of the present disclosure, when the sensing electrodes 120 are arranged along a direction (e.g., a Y direction) in which the magnitude of the display noise is gradually changed, and the driving electrodes 130 are arranged along another direction (e.g., an X direction), the noise compensation electrodes 160 may be arranged in the same direction as the sensing electrodes 120 while forming pairs with the respective sensing electrodes 120. For example, in another embodiment, the sensing electrodes 120 and the noise compensation electrodes 160 may form pairs with each other while extending along a direction in which the magnitude of the display noise is gradually changed, and a pair of a sensing electrode 120 and a noise compensation electrode 160 may be located to overlap with each other. In this case, the third lines 146 may be connected to the noise compensation electrodes 120 in a region into which the display noise having a relatively large intensity is introduced.

In some embodiments, the driving circuit 20 may supply a noise compensation signal Scp corresponding to image data to the noise compensation electrodes 160 during a period in which the pixels PXL of the display panel 300 are driven. As an example, the driving circuit 20 may supply a noise compensation signal Scp corresponding to image data (hereinafter, referred to as "frame data") of each frame (or of a corresponding frame) to the noise compensation electrodes 160 for every frame period (or for a given frame period).

To this end, the driving circuit 20 may include the compensation signal supplier 230 for supplying a noise compensation signal Scp to the noise compensation electrodes 160. In some embodiments, the compensation signal supplier 230 may be provided in the touch driver 200, but the present disclosure is not limited thereto. For example, the compensation signal supplier 230 may be provided in the display driver 400 described above. That is, the compensation signal supplier 230 may be provided in the driving circuit 20, although the position of the compensation signal supplier 230 is not particularly limited. Alternatively, in another embodiment, the display driver 400 may directly supply a noise compensation signal Scp to the sensor portion 100. In this case, the compensation signal supplier 230 might not be separately provided.

That is, the compensation signal supplier 230 may be separately provided in the touch sensor, or may be integrally configured with the display driver 400. Also, the compensation signal supplier 230 may directly generate a noise compensation signal Scp by receiving image data supplied from the display driver 400. Alternatively, the compensation signal supplier 230 may receive a noise compensation signal Scp supplied from the display driver 400, and may transfer the noise compensation signal Scp to the noise compensation electrodes 160.

In some embodiments, the noise compensation signal Scp may be generated by inverting a display noise corresponding to each frame data. That is, as shown in FIG. 6, the noise compensation signal Scp has a waveform that is opposite to that of the display noise, and may be a reverse phase signal of the display noise. Thus, the noise compensation signal Scp is supplied to the noise compensation electrodes 160 during each frame period in which the pixels PXL are driven, the display noise can be removed or reduced as noise cancellation occurs in the sensor portion 100. Accordingly, it is possible to prevent ripples of the sensing signal Sse, caused by the display noise.

Meanwhile, as described above, a variation in magnitude of the display noise may occur even in the sensing region 101 according to positions in the sensing region 101. Accordingly, in the above-described embodiment, the noise compensation signal Scp is supplied to the noise compensation electrodes 160 through a region into which the display noise having a relatively large intensity is introduced. In this case, due to an RC delay that occurs while passing through each of the noise compensation electrodes 160, the magnitude of the noise compensation signal Scp may gradually decrease in a direction from a first end to which the noise compensation signal Scp is applied to another end opposite to the first end.

That is, according to the present disclosure, the magnitude of the noise compensation signal Scp is also changed corresponding to a distribution of display noises and/or a change in magnitude of the display noises in the sensing region 101. Thus, display noises can be effectively reduced or removed in the entire sensing region 101 by compensating for a variation in magnitude of the display noises. According to the embodiment of the present disclosure, although the display device becomes large-sized, display noises can be effectively removed.

A driving method of the touch sensor according to the embodiment of the present disclosure will be briefly described. During a period in which the touch sensor is activated, the touch driving circuit 210 and the compensation signal supplier 230 supply a touch driving signal Sdr and a noise compensation signal Scp to the driving electrodes 130 and the noise compensation electrodes 160, respectively. At this time, the sensing circuit 220 receives a sensing signal Sse from each of the sensing electrodes 120, and detects a touch input using the sensing signals Sse.

In some embodiments, the touch driving circuit 210 may sequentially supply the touch driving signal Sdr to the respective driving electrodes 130. For example, when driving electrodes 130 respectively corresponding to first to mth (m is a natural number of 2 or more) driving channels Tx1 to Txm are located in a direction from a left side to a right side of the sensing region 101, the touch driving circuit 210 may sequentially supply the touch driving signal Sdr to the respective driving electrodes 130 corresponding to the first to mth driving channels Tx1 to Txm.

Meanwhile, the noise compensation signal Scp is a signal generated using image data input from the outside (e.g., externally generated image data). The noise compensation signal Scp is generated before the noise compensation signal is supplied. In addition, during a period in which the pixels PXL are driven corresponding to image data, a noise compensation signal Scp corresponding to the image data may be supplied to the noise compensation electrodes 160. As an example, a display noise introduced into the sensor portion 100 may be predicted corresponding to each frame data, and a noise compensation signal Scp of each frame may be generated corresponding to the display noise. In addition, a noise compensation signal Scp corresponding to the corresponding frame data is supplied to the noise compensation electrodes 160 for every frame period in which the pixels PXL are driven so that the display noise introduced into the sensor portion 100 can be removed or reduced.

According to the above-described embodiment of the present disclosure, the noise compensation electrodes 160 are formed in the sensing region 101 of the touch sensor, which overlaps with the pixels PXL, and a noise compensation signal corresponding to each frame data is supplied to the noise compensation electrodes 160. Accordingly, the display noise can be effectively reduced or removed. Thus, according to the embodiment of the present disclosure, the malfunction of the touch sensor otherwise caused by the display noise can be prevented, and the performance (e.g., sensitivity) of the touch sensor can be improved.

Figure 7:
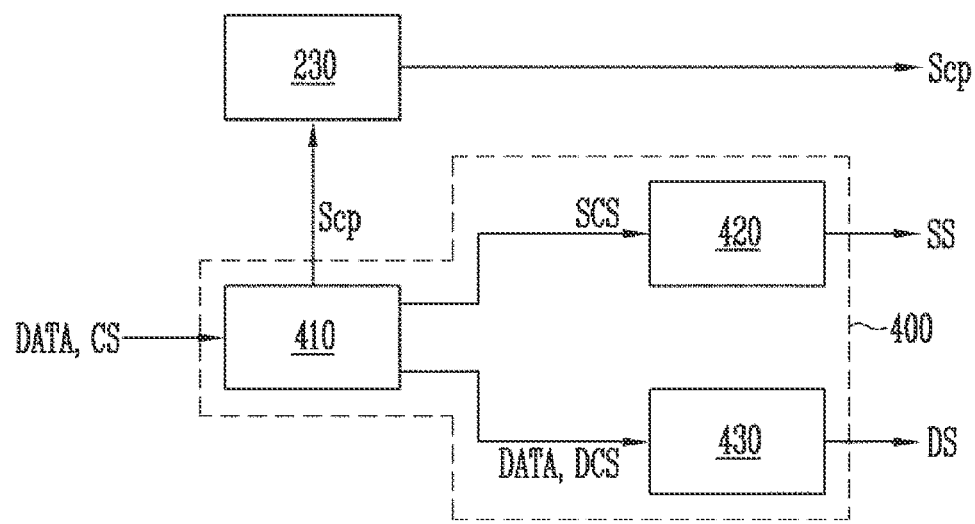
FIG. 7 illustrates a display driver according to an embodiment of the present disclosure.
Figure 8:
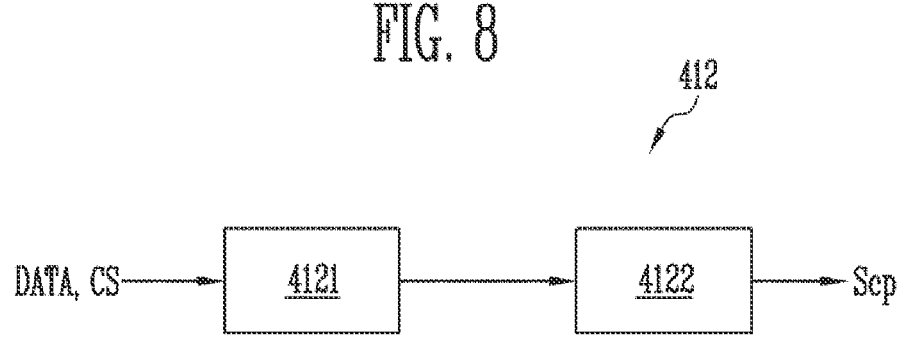
FIG. 8 illustrates a compensation circuit according to an embodiment of the present disclosure.

FIG. 7 illustrates a display driver according to an embodiment of the present disclosure. FIG. 8 illustrates a compensation circuit according to an embodiment of the present disclosure.

First, referring to FIG. 7, the display driver 400 includes a timing controller 410, a scan driver 420, and a data driver 430. In some embodiments, the display driver 400 may be implemented with a TCON embedded driver IC (TED D-IC) having the timing controller 410 embedded therein, but the present disclosure is not limited thereto. Meanwhile, in another embodiment of the present disclosure, at least one of the timing controller 410, the scan driver 420, and the data driver 430 may be formed together with the pixels PXL in the display panel 300, or may be mounted on one region of the display panel 300.

The timing controller 410 is supplied with image data DATA and a driving control signal CS, and drives the scan driver 420 and the data driver 430 in accordance with the image data DATA and the driving control signal CS. In some embodiments, the driving control signal CS may include various timing signals (e.g., a horizontal synchronization signal, a vertical synchronization signal, and the like) for controlling driving of the display device.

The timing controller 410 may generate a scan control signal SCS and a data control signal DCS corresponding to the driving control signal CS, and may supply the scan control signal SCS and the data control signal DCS respectively to the scan driver 420 and the data driver 430. Also, the timing controller 410 may realign image data DATA and supply the image data DATA to the data driver 430. Then, the scan driver 420 generates a scan signal SS corresponding to the scan control signal SCS, and sequentially supplies the scan signal SS to the scan lines 310. In addition, the data driver 430 generates a data signal DS corresponding to the data control signal DCS and the image data DATA, and supplies the data signal DS to the data lines 320. Accordingly, the data signal DS is transferred to the pixels PXL, and each of the pixels PXL respectively emits light with a luminance corresponding to the data signal DS.

Additionally, in an embodiment of the present disclosure, the timing controller 410 may generate a noise compensation signal Scp corresponding to the image data DATA and the driving control signal CS. To this end, the timing controller 410 may include a compensation circuit 412 as shown in FIG. 8.

In some embodiments, the compensation circuit 412 may include a representative value generator 4121 and a compensation signal generator 4122. The representative value generator 4121 may generate a representative value of each frame data, using image data DATA. As an example, the representative value generator 4121 may extract any one of a maximum gray scale value, a middle gray scale value, and an average gray scale value of each frame data included in the image data DATA, and may output the extracted value as a representative value. In some embodiments, the representative value generator 4121 may be configured with a representative value calculation circuit having various structures currently known in the art, and the structure and driving method of the representative value generator 4121 is not particularly limited.

The compensation signal generator 4122 generates a noise compensation signal Scp, using the representative value input from the representative value generator 4121. As an example, the compensation signal generator 4122 may generate a noise compensation signal Scp by predicting (e.g., calculating or extracting) a display noise corresponding to the representative value of each frame data, and by reversing the display noise. In some embodiments, the compensation signal generator 4122 may calculate or extract a display noise corresponding to the representative value of each frame data from a formula, a rule, and/or a graph, which may be previously stored, or may extract a display noise from noise information previously stored corresponding to the respective representative values, so that a display noise of each frame can be predicted.

The noise compensation signal Scp generated by the compensation signal generator 4122 may be immediately transferred to the noise compensation electrodes 160, or may be transferred to the noise compensation electrodes 160 via the compensation signal supplier 230.

Meanwhile, a case where the compensation circuit 412 is provided in the timing controller 410 is illustrated in the above-described embodiment, but the position of the compensation circuit 412 is not limited thereto. For example, in another embodiment, the compensation circuit 412 may be provided outside of the timing controller 410 (e.g., the inside of the touch driver 200 and/or the compensation signal supplier 230). In this case, the timing controller 410 may transfer image data DATA to the compensation circuit 412.

Figure 9:
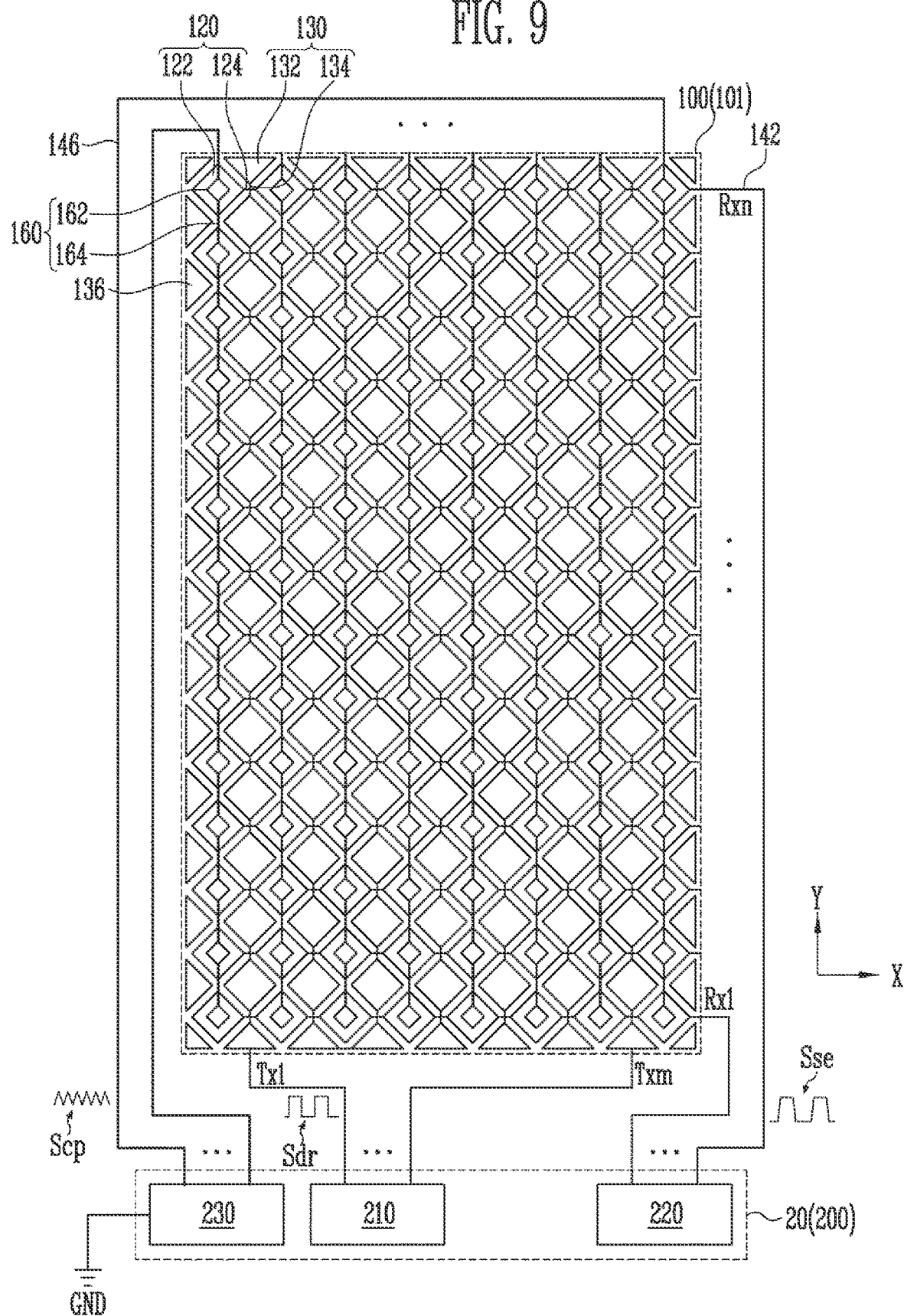
FIG. 9 illustrates a touch sensor according to an embodiment of the present disclosure.

FIG. 9 illustrates a touch sensor according to an embodiment of the present disclosure. For example, FIG. 9 illustrates a modification of the embodiment of FIG. 4. In FIG. 9, components similar or identical to those of FIG. 4 are designated by like reference numerals, and their detailed descriptions will not be repeated.

Referring to FIG. 9, in some embodiments, a compensation signal supplier 230 may be connected to a given reference voltage source, such as a ground power source GND. That is, in some embodiments, noise compensation electrodes 160 are not connected to a timing controller 410 or a separate compensation circuit 412, but may be connected to the ground power source GND, etc., to maintain a certain potential. Accordingly, a variation in voltage of a sensing signal Sse, which is caused by a display noise, can be prevented or reduced, and the sensitivity of the touch sensor can be improved.

Figure 10:
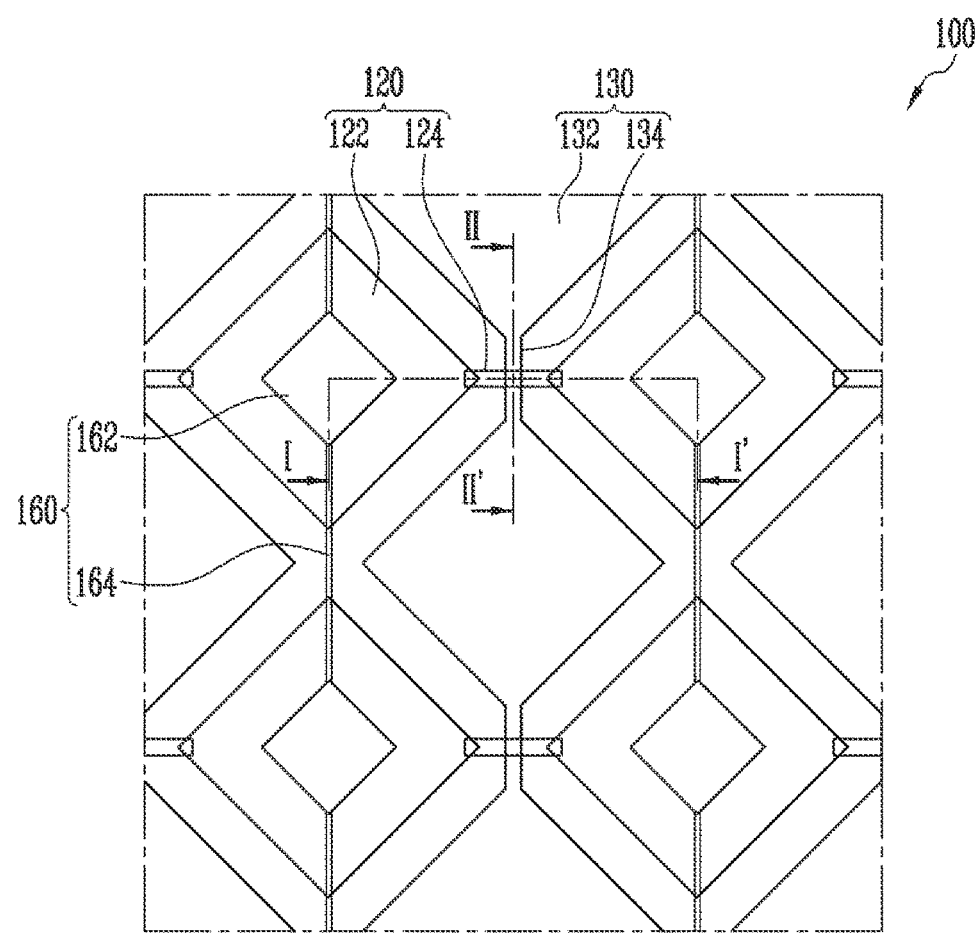
FIG. 10 illustrates a region of the sensor portion shown in FIGS. 4 and 9.
Figure 11A:
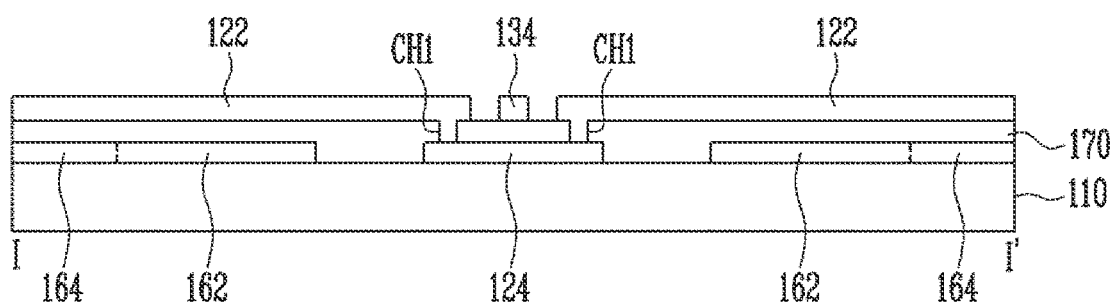
FIG. 11A illustrates an example of a section taken along the line I-I' of FIG. 10.
Figure 11B:
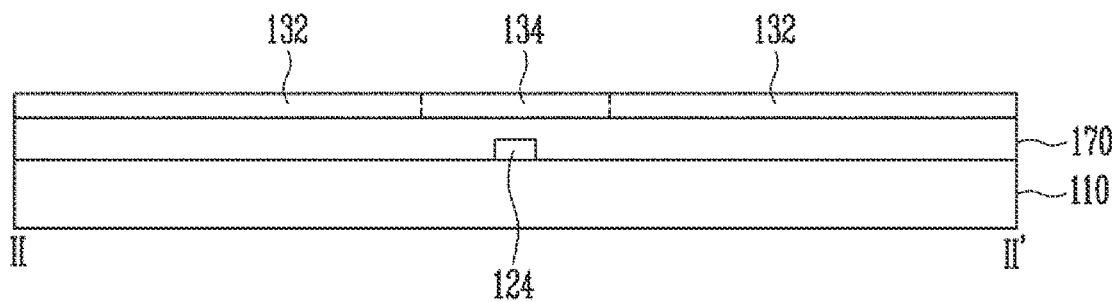
FIG. 11B illustrates an example of a section taken along the line II-II' of FIG. 10.

FIG. 10 illustrates a region of the sensor portion shown in FIGS. 4 and 9. For example, FIG. 10 illustrates an embodiment of sensor patterns. FIG. 11A illustrates an example of a section taken along the line I-I' of FIG. 10. FIG. 11B illustrates an example of a section taken along the line II-II' of FIG. 10. In FIGS. 10 to 11B, components similar or identical to those of FIGS. 4 and 9 are designated by like reference numerals, and their detailed descriptions will not be repeated.

Referring to FIGS. 10 to 11B, in some embodiments, the first electrode cells 122 and the second electrode cells 132 may be located on the same layer. In addition, one of the first connection parts 124 and the second connection parts 134 may be located on the same layer as the first and second electrode cells 122 and 132. As an example, the second connection parts 134 may be integrally connected to the second electrode cells 132.

Also, in some embodiments, the first connection parts 124 and the noise compensation electrodes 160 may be provided on the same layer while being spaced apart from each other. For example, the first connection parts 124 and the electrode parts 162 may be provided on the same layer to be spaced apart from each other, and the connection lines 164 may be integrally connected to the electrode parts 162.

In some embodiments, the sensing electrodes 120 and the noise compensation electrodes 160 may be insulated from each other by an insulating layer 170 provided therebetween. In addition, the first connection parts 124 and the second connection parts 134 may also be insulated from each other by the insulating layer 170. In this case, the first connection parts 124 may be connected to adjacent first electrode cells 122 through first contact holes CH1 passing through the insulating layer 170.

Also, in some embodiments, a case where the first connection parts 124 are located on a lower layer below the layer on which the first and second electrode cells 122 and 132 are located is illustrated in FIGS. 11A and 11B, but the present disclosure is not limited thereto. For example, in another embodiment, the first connection parts 124 may be located on an upper layer above the layer on which the first and second electrode cells 122 and 132 are located.

Also, in some embodiments, a case where the electrode parts 162 are located on a lower layer (e.g., a layer on which the first connection parts 124 are located) below the layer on which the first and second electrode cells 122 and 132 are located is illustrated in FIGS. 8A and 8B, but the present disclosure is not limited thereto. For example, in another embodiment, the electrode parts 162 may be located on the same layer as the first and second electrode cells 122 and 132. As an example, the electrode parts 162 may be respectively located in openings formed by opening the centers of the first electrode cells 122. In this case, the electrode parts 162 and the connection lines 164 may be located on different layers, and additional contact holes for connecting the electrode parts 162 and the connection lines may be formed in the insulating layer 170. Also, in another embodiment, the electrode parts 162 and/or the connection lines 164 may be located on an upper layer of the layer on which the first and second electrode cells 122 and 132 are located.

In the above-described embodiment, each of the electrode parts 162 is located at the inside (e.g., the center) of a first electrode cell 122 corresponding thereto. In this case, signal interface between the driving electrodes 130 and the noise compensation electrodes 160 can be reduced or minimized by ensuring a spacing distance between the driving electrodes 130 and the noise compensation electrodes 160.

Also, in another embodiment, the electrode parts 162 and the connection lines 164 may be located on another layer that is different from the layer on which the first and second electrode cells 122 and 132 and the first and second electrode parts 124 and 134 are located. As an example, a sensor electrode layer on which the sensing electrodes 120 and the driving electrodes 130 are located may be separated from a noise compensation layer on which the compensation electrodes 160 are located, and the noise compensation layer may be located as an intermediate layer between the sensor electrode layer and a display pattern layer on which the pixels PXL are located to compensate and/or shield a display noise.

Meanwhile, in some embodiments, a base substrate 110 that becomes a base member of the sensor portion 100 may be a TFE of an organic light emitting display panel. In this case, the base substrate 110 may be provided in a multi-layer including at least one organic layer and at least one inorganic layer, or may be provided in a single layer including an organic-inorganic hybrid material. As an example, the base substrate 110 may be provided in a multi-layer including at least two inorganic layers and at least one organic layer interposed between the inorganic layers. In a display device in which the base substrate 110 is implemented as the TFE of the organic light emitting display panel, sensor patterns constituting the sensor portion 100 and display patterns constituting a display panel 300 may be located on different surfaces of the base substrate 110. That is, at least one of the sensing electrodes 120, the driving electrodes 130, and the noise compensation electrodes 160, which are provided in the sensor portion 100, may be directly formed and/or located on one surface of the encapsulation layer that covers the pixels PXL of the display panel 300.

Figure 12:
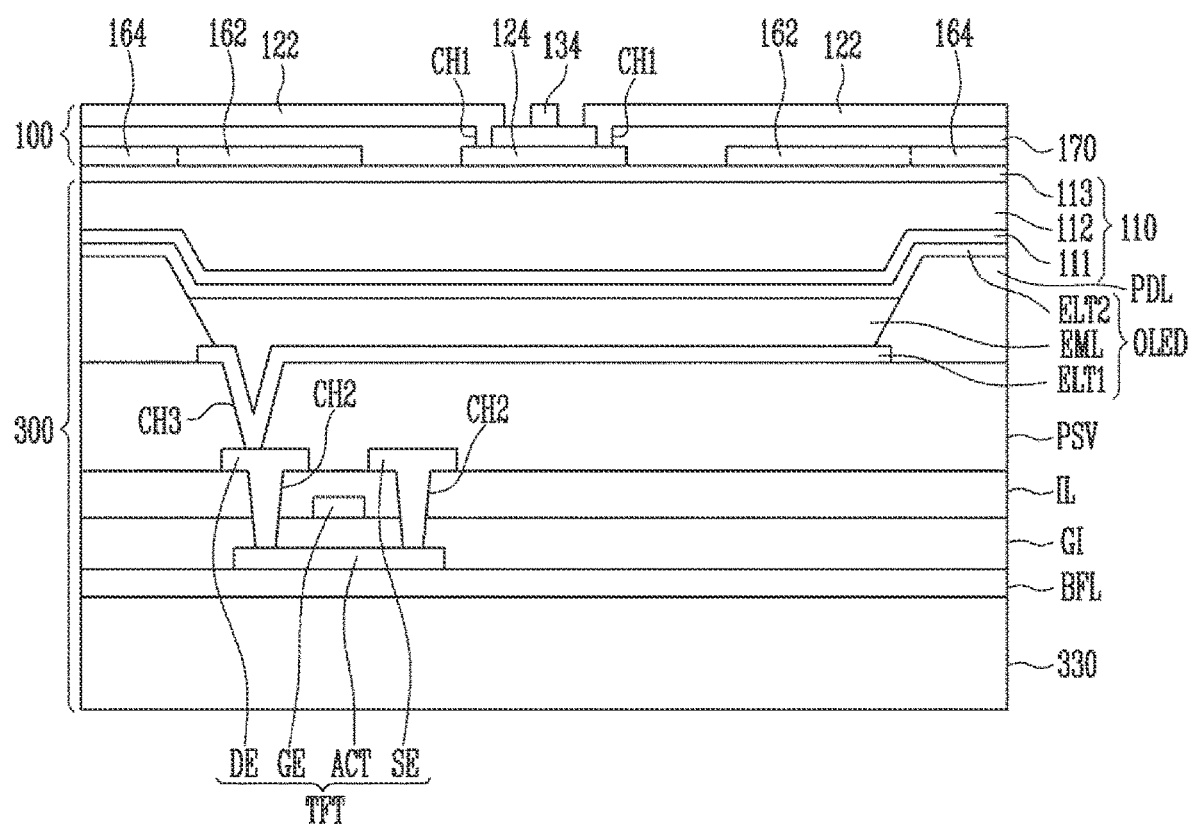
FIG. 12 illustrates an example of a section of a display device according to an embodiment of the present disclosure.

FIG. 12 illustrates an example of a section of a display device according to an embodiment of the present disclosure. For example, FIG. 12 illustrates an embodiment related to the arrangement structure of a sensor portion and a display panel. In FIG. 12, a detailed description of the structure of the above-described sensor portion described above will be omitted.

Referring to FIG. 12, the sensor portion 100 may be directly formed and/or provided on a TFE 110 of the display panel (e.g., an organic light emitting display panel) 300. Accordingly, a sensor-display integrated organic light emitting display panel can be provided. That is, in some embodiments, the above-described base substrate 110 may be the TFE of the display panel 300, and therefore, they are designated by the same reference numeral. For convenience, only a light emitting device (e.g., an organic light emitting diode) OLED and one thin film transistor TFT connected thereto among pixel patterns provided in each pixel region of the display panel 300 are illustrated in FIG. 12.

In some embodiments, the display panel 300 includes a first substrate 330, a light emitting device OLED provided on one surface of the first substrate 330, and a TFE 110 covering at least a display region 301 including pixels PXL each including the light emitting device OLED. Also, in some embodiments, the display panel 300 may further include at least one thin film transistor TFT connected to the light emitting device OLED. In some embodiments, the thin film transistor TFT may be located between the first substrate 330 and the light emitting device OLED. In addition, the display panel 300 may further include at least one power line, at least one signal line, and/or at least one capacitor, and the like.

In some embodiments, the first substrate 330 may be a rigid substrate or a flexible substrate, and the material of the first substrate 330 is not particularly limited. As an example, the first substrate 330 may be a thin film substrate having flexibility. A buffer layer BFL may be provided on one surface of the first substrate 330. The buffer layer BFL may prevent an impurity from being diffused from the first substrate 330, and may improve the flatness of the first substrate 330. In some embodiments, the buffer layer BFL may be provided in a single layer, but be provided in a multi-layer including at least two layers. In some embodiments, the buffer layer BFL may be an inorganic insulating layer made of an inorganic material. For example, the buffer layer BFL may be formed of silicon nitride, silicon oxide, silicon oxynitride, or the like. When the buffer layer BFL is provided in the multi-layer, the layers may be formed of the same material or be formed of different materials. Meanwhile, in another embodiment, the buffer layer BFL may be omitted.

The thin film transistor TFT is provided on the buffer layer BFL. The thin film transistor TFT includes an active layer ACT, a gate electrode GE, a source electrode SE, and a drain electrode DE. In some embodiments, the active layer ACT may be provided on the buffer layer BFL, and be formed of a semiconductor material. For example, the active layer ACT may be a semiconductor pattern made of poly-silicon, amorphous silicon, oxide semiconductor, or the like, and be formed of a semiconductor layer undoped or doped with an impurity. Alternatively, one region of the active layer ACT is undoped with the impurity, and the other region of the active layer ACT may be doped with the impurity.

In some embodiments, a gate insulating layer GI may be provided over the active layer ACT, and the gate electrode GE may be provided on the gate insulating layer GI. In addition, an interlayer insulating layer IL may be provided over the gate electrode GE, and the source electrode SE and the drain electrode DE may be provided on the interlayer insulating layer IL. The source electrode SE and the drain electrode DE may be connected to different regions of the active layer ACT through second contact holes CH2 passing through the gate insulating layer GI and the interlayer insulating layer IL, respectively.

In some embodiments, a passivation layer PSV may be provided over the source electrode SE and the drain electrode DE. The passivation layer PSV may cover the thin film transistor TFT and planarize a top surface of the thin film transistor TFT.

In some embodiments, the light emitting device OLED may be provided on the passivation layer PSV. The light emitting device OLED may include a first electrode ELT1, a second electrode ELT2, and an emitting layer EML interposed between the first and second electrodes ELT1 and ELT2. In some embodiments, the first electrode ELT1 of the light emitting device OLED may be an anode electrode, but the present disclosure is not limited thereto. The first electrode ELT1 of the light emitting device OLED is connected to one electrode (e.g., the drain electrode DE) of the thin film transistor TFT through a third contact hole CH3 passing through the passivation layer PSV.

A pixel defining layer PDL that defines each pixel region (or a light emitting region of each pixel) is provided on one surface of the first substrate 330 on which the first electrode ELT1 of the light emitting device OLED is formed. In some embodiments, the pixel defining layer PDL may expose an upper surface of the first electrode ELT1, and protrude from the first substrate 330 along the circumference of each pixel region.

The emitting layer EML is provided in the pixel region surrounded by the pixel defining layer PDL. The emitting layer EML may be located on the exposed surface of the first electrode ELT1. In some embodiments, the emitting layer EML may have a multi-layered thin film structure including at least a light generation layer. For example, the emitting layer EML may include a hole injection layer, a hole transport layer, the light generation layer, a hole blocking layer, an electron transport layer, and an electron injection layer. In some embodiments, the color of light generated from the emitting layer EML may be one of red, green, blue, and white, but the present disclosure is not limited.

In some embodiments, the second electrode ELT2 of the light emitting device OLED may be located on the emitting layer EML. In some embodiments, the second electrode ELT2 of the light emitting device OLED may be a cathode electrode, but the present disclosure is not limited.

In some embodiments, the TFE 110 that covers the second electrode ELT2 of the light emitting device OLED may be provided over the second electrode ELT of the light emitting device OLED. When the display region 301 of the display panel 300 is sealed using the TFE 110, the thickness of the display panel is decreased, and flexibility can be ensured.

In some embodiments, the TFE 110 may be provided in a multi-layered or single-layered structure. As an example, the TFE 110 may include a first inorganic layer 111 and a second inorganic layer 113, which overlap with each other, and an organic layer 112 interposed between the first and second inorganic layers 111 and 113. Alternatively, in another embodiment, the TFE 110 may be implemented as a single layer complexly including organic and inorganic materials.

In some embodiments, the organic layer 112 may have a thickness larger than that of the first and second inorganic layers 111 and 113. As an example, the organic layer 112 may have a thickness of about 4 μm to about 10 μm, and each of the first and second inorganic layers 111 and 113 may have a thickness of about 8000 Å to about 10000 Å.

In the display device according to the above-described embodiment, the display panel 300 is implemented as the organic light emitting display panel including the TFE 110, and the sensor patterns of the sensor portion 100 are directly formed on the TFE 110. For example, the sensing electrodes 120, the driving electrodes 130, and/or the noise compensation electrodes 160 may be directly formed on an upper surface of the TFE 110. In this case, the sensing electrodes 120, the driving electrodes 130, and/or the noise compensation electrodes 160 overlap with the pixels PXL with the TFE 110 interposed therebetween, and the sensor patterns are located close to the display patterns provided in the display panel 300 (e.g., the second electrode ELT2 of the light emitting device OLED).

Accordingly, a display noise from the second electrode ELT2 of the light emitting device OLED can be introduced into the sensor patterns. In the present disclosure, as described in the above-described embodiments, a noise compensation signal Scp is supplied to the noise compensation electrodes 160, or the noise compensation electrodes 160 is connected to the ground power source GND, so that the display noise can be removed or shielded.

Thus, the sensitivity of the touch sensor can be sufficiently ensured even when the sensor-display integrated display panel is implemented as shown in FIG. 12, and the organic layer 112 of the TFE 110 is formed thin with a thickness of approximately 10 μm or less. For example, according to the embodiment of the present disclosure, the sensitivity of the touch sensor can be sufficiently ensured even when the entire thickness of the TFE 110 is designed to be about 10 μm or less.

Figure 13:
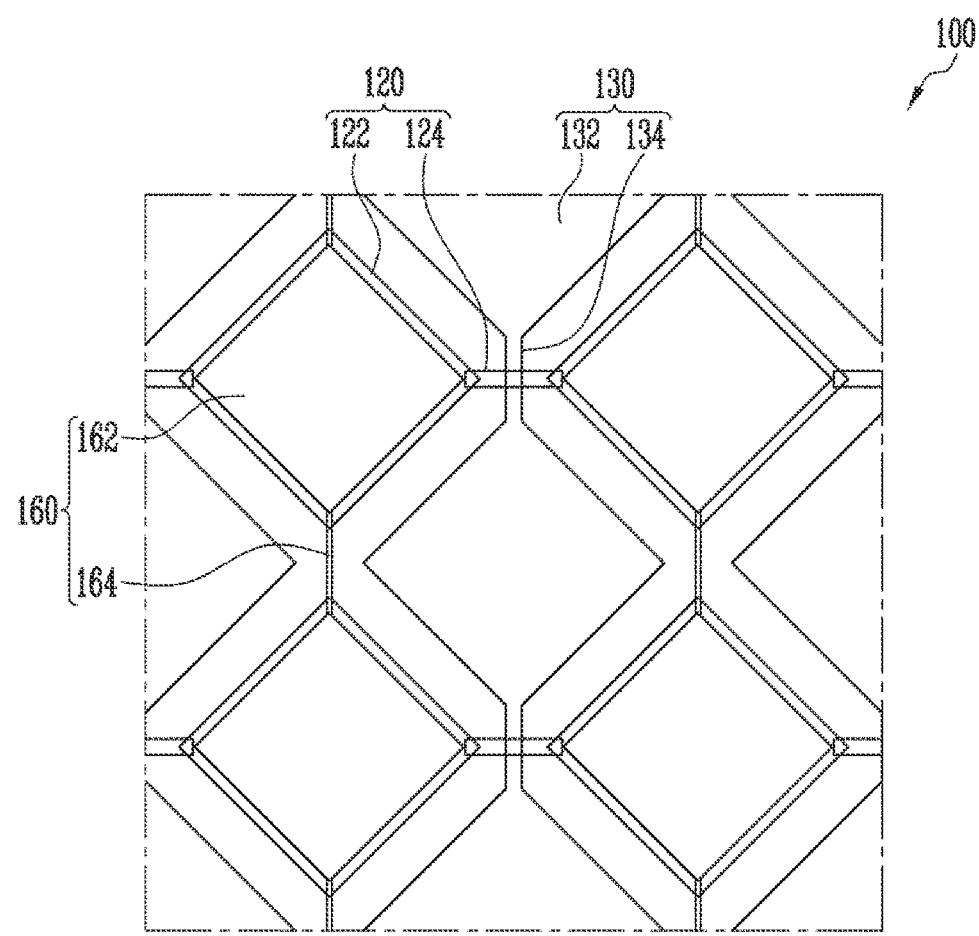
FIGS. 13 to 15 illustrate other embodiments of the region of the sensor portion shown in FIGS. 4 and 9.
Figure 14:
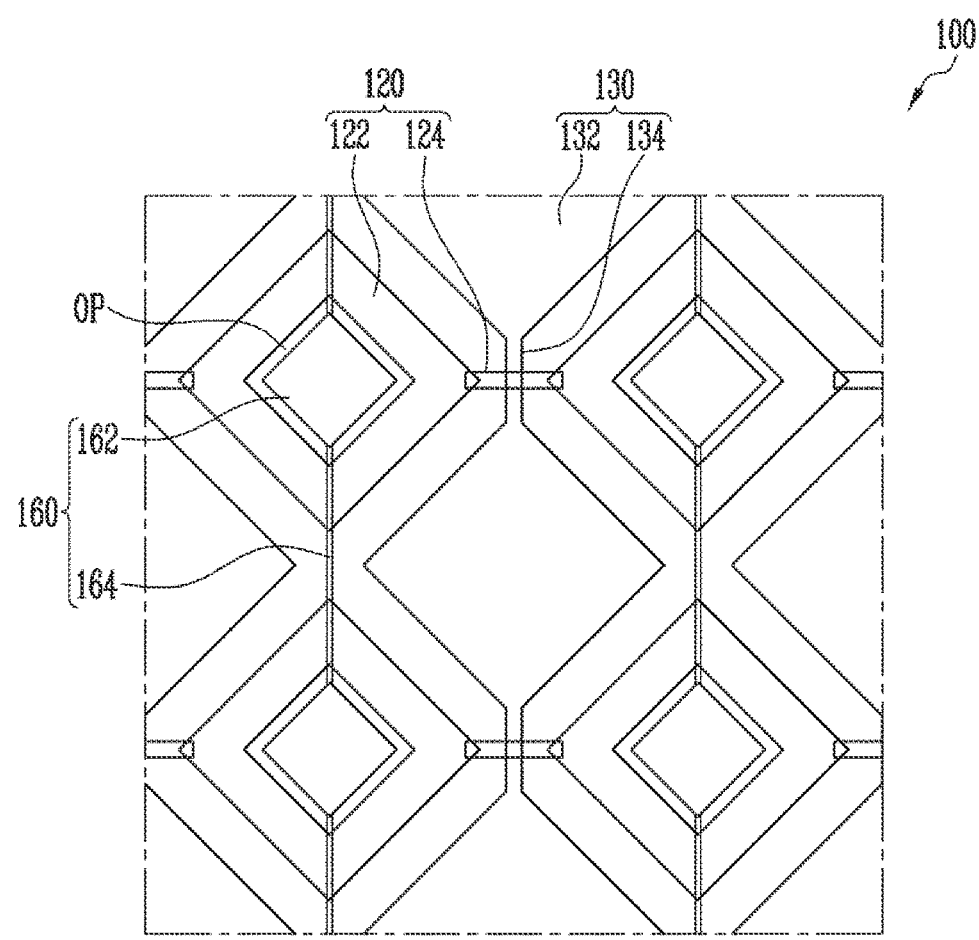
Figure 15:
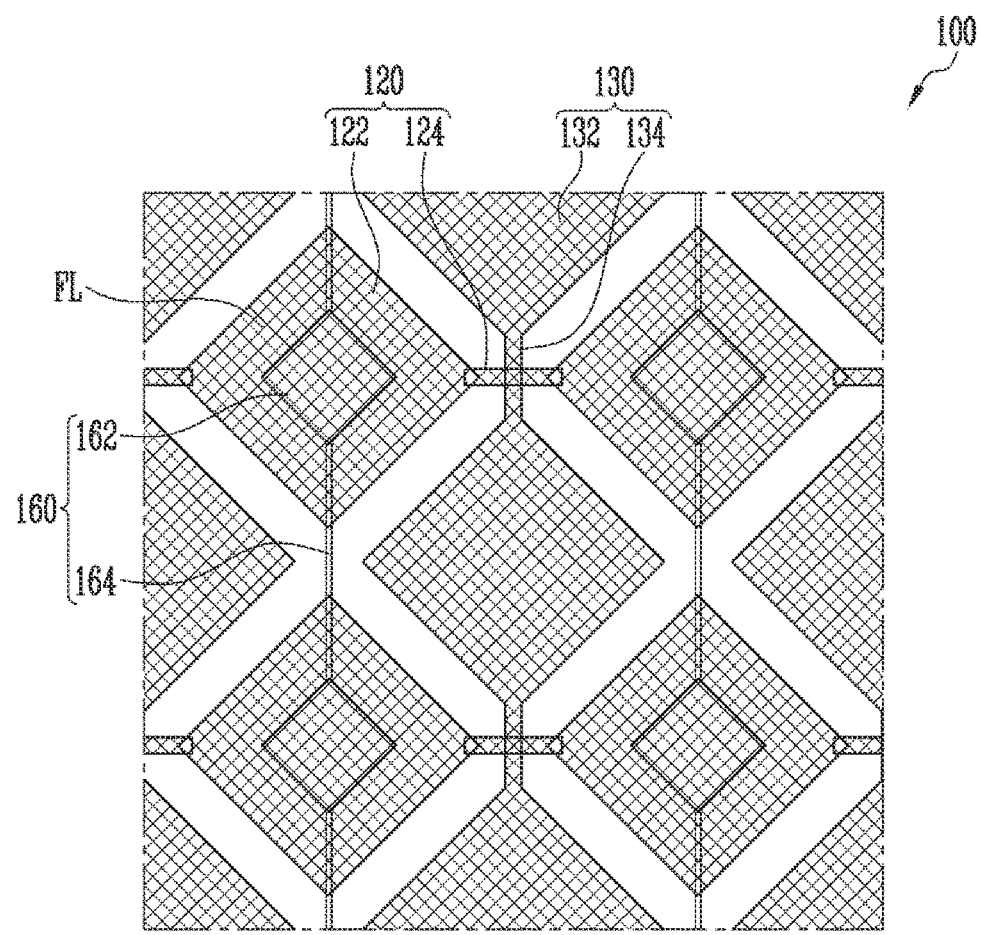

FIGS. 13 to 15 illustrate other embodiments of the region of the sensor portion shown in FIGS. 4 and 9. For example, FIGS. 13 to 15 illustrate other modifications of the embodiment of the FIG. 10. In FIGS. 13 to 15, components similar or identical to those of FIGS. 4 and 9 are designated by like reference numerals, and their detailed descriptions will not be repeated.

Referring to FIG. 13, each electrode part 162 may extend to have an area similar or substantially equal to a first electrode cell 122 corresponding thereto. In some embodiments, the noise compensation electrodes 160 may be located on a layer that is different from that of the sensing electrodes 120. As an example, the noise compensation electrodes 160 may be located between the display panel 300 and the sensing electrodes 120. If an electrode part 162 and a first electrode cell 122, which correspond to each other, are formed to have the same size and/or area, and overlap with each other, the display noise can be more effectively compensated or shielded.

Referring to FIG. 14, in some embodiments, each first electrode cell 122 may include an opening OP provided at the inside (e.g., the center) thereof, and each electrode part 162 may be located in the opening OP of a first electrode cell 122 corresponding thereto. In this case, the electrode part 162 may be located on the same layer as the first electrode cell 122 to be spaced apart from the first electrode cell 122. Alternatively, in another embodiment, the electrode parts 162 and the first electrode cells 122 are located in different layers, and each of the electrode parts 162 may be located to overlap with the opening OP of any one first electrode cell 122. Alternatively, in another embodiment, the electrode parts 162 and the first electrode cells 122 are located in different layers, and dummy patterns overlapping with the electrode parts 162 may be located in the openings OP of the first electrode cells 122, respectively.

Referring to FIG. 15, the sensing electrodes 120, the driving electrodes 130, and/or the noise compensation electrodes 160 may be implemented with mesh-type electrodes and/or mesh-type patterns, each of which includes a plurality of conductive fine lines FL. As an example, at least some of the first electrode cells 122, the first connection parts 124, the second electrode cells 132, the second connection parts 134, the electrode parts 162, and the connection lines 164 may be implemented with mesh-type electrodes and/or mesh-type patterns.

That is, in the present disclosure, the positions, shapes, and structures of the sensing electrodes 120, the driving electrodes 130, and/or the noise compensation electrodes 160, and the arrangement relationship between the sensing electrodes 120, the driving electrodes 130, and/or the noise compensation electrodes 160 may be variously modified and embodied. As an example, the sensor portion 100 may be designed by synthetically considering various factors, such as a viewing characteristic of the display region 301 (sensing region 101), noise compensation or shielding effect, and/or signal interference.

In the display device and the method of driving the same according to the present disclosure, noise compensation electrodes 160 are formed in the sensing region 101 of the touch sensor, and a noise compensation signal Scp corresponding to image data of each frame is supplied to the noise compensation electrodes 160. Accordingly, a display noise introduced into the sensor portion 100 of the touch sensor by display driving can be effectively removed. According to the present disclosure, in the display device including the touch sensor, the malfunction of the touch sensor, caused by the display noise, can be prevented, and the performance of the touch sensor can be improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims, with functional equivalents thereof to be included.

What is claimed is:

1. A display device comprising:
   a display region, and a sensing region overlapping the display region;
   pixels in the display region;
   an encapsulation layer on the pixels;
   sensing electrodes on the encapsulation layer, overlapping the sensing region, and comprising first electrode cells defining an opening, and first connection parts connecting the first electrode cells in a first direction;
   driving electrodes on the encapsulation layer, overlapping the sensing region, and comprising second electrode cells that are spaced from the first electrode cells, and second connection parts connecting the second electrode cells in a second direction;
   conductive patterns comprising electrode parts that are spaced from the first electrode cells in the opening of each of the first electrode cells, and connection lines respectively connecting two or more of the electrode parts;
   a line connected to an end of the conductive patterns adjacent to an edge of the sensing region; and
   a driving circuit configured to generate a noise compensation signal based on image data of each frame, and to supply the noise compensation signal to the conductive patterns through the line,
   wherein the first connection parts or the second connection parts are at a same layer as the first electrode cells and the second electrode cells, and
   wherein at least one of the first connection parts, the second connection parts, the first electrode cells, or the second electrode cells is directly on an upper surface of the encapsulation layer.

2. The display device of claim 1, wherein the electrode parts are spaced from each other at a same layer as the first connection parts.

3. The display device of claim 2, wherein the first connection parts are at a layer different from that of the first electrode cells and the second electrode cells.

4. The display device of claim 1, wherein the first electrode cells have a shape surrounding each of the electrode parts.

5. The display device of claim 1, wherein the first electrode cells are between the electrode parts and the second electrode cells in a plan view.

6. The display device of claim 1, wherein the opening is at a central portion of each of the first electrode cells.

7. The display device of claim 1, wherein the first electrode cells and the second electrode cells are alternately located in the sensing region.

* * * * *